(12) United States Patent
Gopalakrishnan et al.

(10) Patent No.: US 9,197,712 B2
(45) Date of Patent: Nov. 24, 2015

(54) MULTI-STAGE BATCHING OF CONTENT DISTRIBUTION IN A MEDIA DISTRIBUTION SYSTEM

(71) Applicant: AT&T Intellectual Property I, L.P., Atlanta, GA (US)

(72) Inventors: Vijay Gopalakrishnan, Edison, NJ (US); Chamil Jayasundara, Moonee Ponds (AU)

(73) Assignees: AT&T INTELLECTUAL PROPERTY I, L.P., Atlanta, GA (US); THE UNIVERSITY OF MELBOURNE, Melbourne (AU)

( * ) Notice: Subject to any disclaimer, the term of this patent is extended or adjusted under 35 U.S.C. 154(b) by 189 days.

(21) Appl. No.: 13/689,889

(22) Filed: Nov. 30, 2012

(65) Prior Publication Data

US 2014/0157337 A1 Jun. 5, 2014

(51) Int. Cl.
*H04N 21/239* (2011.01)
*H04N 21/238* (2011.01)
*H04N 21/24* (2011.01)
(Continued)

(52) U.S. Cl.
CPC ........ *H04L 67/2842* (2013.01); *H04L 65/4076* (2013.01); *H04L 65/4084* (2013.01); *H04N 21/2225* (2013.01); *H04N 21/262* (2013.01); *H04N 21/6405* (2013.01); *H04N 21/8456* (2013.01)

(58) Field of Classification Search
CPC ............... H04N 21/2225; H04N 21/23106; H04N 21/2385; H04N 21/2393; H04N 21/47202; H04N 21/23805; H04N 21/2401; H04N 21/2402; H04N 21/6375; H04N 21/64322; H04N 21/6581
USPC ...................................... 725/91–98
See application file for complete search history.

(56) References Cited

U.S. PATENT DOCUMENTS 5,652,613 A 7/1997 Lazarus et al.
5,815,662 A 9/1998 Ong
(Continued)

OTHER PUBLICATIONS

"Technique for Optimal Assignment of Traffic to Routes in Telecommunication Networks," IBM Technical Disclosure Bulletin, vol. 25, Issue 11B, Apr. 1, 1983, 2 pages.
(Continued)

*Primary Examiner* — Benjamin R Bruckart
*Assistant Examiner* — Aklil Tesfaye
(74) *Attorney, Agent, or Firm* — Toler Law Group, PC

(57) ABSTRACT

A method includes receiving, at a first level distribution node of a plurality of first level distribution nodes of a hierarchical media distribution system (HMDS), a request for a content item (associated with segments corresponding to a time order) from a first endpoint device. The method includes, in response to receiving the request, sending, from the first level distribution node, a first data stream corresponding to a first segment of the content item to the first endpoint device and sending first information (indicating the request and a first end time of the first data stream) to a second level distribution node of a plurality of second level distribution nodes of the HMDS. The method includes receiving, from the second level distribution node, a second data stream corresponding to a second segment before the first end time has been reached and sending the second data stream to the first endpoint device.

20 Claims, 17 Drawing Sheets

(51) Int. Cl.

| | |
|---|---|
| H04N 21/6375 | (2011.01) |
| H04N 21/643 | (2011.01) |
| H04N 21/658 | (2011.01) |
| H04L 29/08 | (2006.01) |
| H04N 21/2225 | (2011.01) |
| H04N 21/262 | (2011.01) |
| H04N 21/6405 | (2011.01) |
| H04N 21/845 | (2011.01) |
| H04L 29/06 | (2006.01) |

(56) References Cited

U.S. PATENT DOCUMENTS

| | | | |
|---|---|---|---|
| 5,916,303 | A | 6/1999 | Scott |
| 5,991,306 | A | 11/1999 | Burns et al. |
| 6,744,727 | B2 | 6/2004 | Liu et al. |
| 6,769,127 | B1 | 7/2004 | Bonomi et al. |
| 6,868,452 | B1 | 3/2005 | Eager et al. |
| 6,973,621 | B2 | 12/2005 | Sie |
| 7,028,096 | B1 | 4/2006 | Lee |
| 7,080,400 | B1 | 7/2006 | Navar |
| 7,155,735 | B1 | 12/2006 | Ngo et al. |
| 7,278,152 | B1 | 10/2007 | Rao |
| 7,278,153 | B1 | 10/2007 | Sanders |
| 7,404,201 | B2 | 7/2008 | Takeuchi et al. |
| 7,418,494 | B2 | 8/2008 | Dahlin |
| 7,451,474 | B1 | 11/2008 | McBreen et al. |
| 7,725,569 | B2 | 5/2010 | Brady |
| 7,761,900 | B2 | 7/2010 | Crayford |
| 7,801,177 | B2 | 9/2010 | Luss |
| 7,818,402 | B1 | 10/2010 | Zhang |
| 7,903,652 | B2 | 3/2011 | Huang |
| 8,191,097 | B1 | 5/2012 | Armstrong et al. |
| 8,312,161 | B2 | 11/2012 | Ganesan |
| 8,447,875 | B2 | 5/2013 | Liu et al. |
| 8,464,303 | B2 | 6/2013 | Sofman et al. |
| 2001/0036271 | A1* | 11/2001 | Javed .................... 380/217 |
| 2002/0059621 | A1 | 5/2002 | Thomas et al. |
| 2002/0069420 | A1 | 6/2002 | Russell et al. |
| 2002/0078174 | A1 | 6/2002 | Sim et al. |
| 2003/0005457 | A1 | 1/2003 | Faibish et al. |
| 2003/0149988 | A1 | 8/2003 | Ellis et al. |
| 2003/0204856 | A1 | 10/2003 | Buxton |
| 2004/0103437 | A1 | 5/2004 | Allegrezza et al. |
| 2004/0220966 | A1* | 11/2004 | Ridge .................... 707/104.1 |
| 2004/0261094 | A1 | 12/2004 | Huslak et al. |
| 2005/0147075 | A1* | 7/2005 | Terry .................... 370/338 |
| 2005/0183127 | A1* | 8/2005 | Ngo et al. ............. 725/90 |
| 2005/0261946 | A1 | 11/2005 | Howlett et al. |
| 2005/0289618 | A1 | 12/2005 | Hardin |
| 2007/0107025 | A1 | 5/2007 | Li et al. |
| 2007/0186272 | A1 | 8/2007 | Hunter et al. |
| 2008/0034393 | A1* | 2/2008 | Crayford ............... 725/87 |
| 2008/0059721 | A1 | 3/2008 | Turner et al. |
| 2008/0071570 | A1 | 3/2008 | Hyde et al. |
| 2008/0115167 | A1* | 5/2008 | Hermsmeyer et al. ... 725/46 |
| 2009/0083813 | A1* | 3/2009 | Dolce et al. .......... 725/93 |
| 2009/0158362 | A1* | 6/2009 | Kajos .................... 725/91 |
| 2009/0217326 | A1 | 8/2009 | Hasek |
| 2009/0217329 | A1 | 8/2009 | Riedl et al. |
| 2009/0248901 | A1* | 10/2009 | Medin, Jr. ............. 709/249 |
| 2010/0153575 | A1 | 6/2010 | Liu et al. |
| 2010/0186025 | A1 | 7/2010 | Thomas et al. |
| 2011/0055347 | A1 | 3/2011 | Hu et al. |
| 2011/0255555 | A1 | 10/2011 | Alexander |
| 2012/0137336 | A1 | 5/2012 | Applegate |
| 2012/0291076 | A1* | 11/2012 | Armstrong et al. ..... 725/93 |
| 2013/0013731 | A1* | 1/2013 | Ree et al. .............. 709/217 |
| 2013/0276040 | A1* | 10/2013 | Ganesan ................ 725/93 |
| 2013/0329650 | A1* | 12/2013 | Cui et al. .............. 370/329 |

OTHER PUBLICATIONS

Agarwal, S. et al., "Volley: Automated Data Placement for Geo-Distributed Cloud Services," In Proceedings of Usenix NSDI, 2010, 16 pages.

Alzoubi, H.A. et al., "Anycast CDNs Revisited," Proceedings of the 17th International Conference on World Wide Web, 2008, 10 pages.

Applegate, D. et al., "Optimal Content Placement for a Large-Scale VoD System," AT&T Labs Research, Nov. 8, 2010, pp. 1-22.

Asur, S. et al., "Predicting The Future With Social Media," Proceedings of the 2010 IEEE/WIC/ACM International Conference on Web Intelligence and Intelligent Agent Technology, vol. 1, Mar. 2010, 8 pages.

Baev, I. et al., "Approximation Algorithms for Data Placement Problems," SIAM Journal on Computing, vol. 38, Issue 4, Jul. 2008, pp. 1-18.

Barbir, A. et al., "Known Content Network (CN) Request-Routing Mechanisms," Network Working Group Request for Comments: 3568, Category: Informational, Jul. 2003, pp. 1-20.

Bienstock, D., "Potential Function Methods for Approximately Solving Linear Programming Problems: Theory and Practice," Aug. 21, 2001, 104 pages.

Borst, S. et al., "Distributed Caching Algorithms for Content Distribution Networks," Proceeding of IEEE INFOCOM, 2010, 10 pages.

Byrka, J. "An Optimal Bifactor Approximation Algorithm For The Metric Uncapacitated Facility Location Problem," SIAM Journal on Computing, vol. 39, No. 6, 2010, 11 pages.

Cha, M. et al., "I Tube, You Tube, Everybody Tubes: Analyzing The World's Largest User Generated Content Video System," Proceedings of ACM IMC, 2007, 13 pages.

Fan, L. et al., "Summary Cache: A Scalable Wide-Area Web Cache Sharing Protocol," IEEE/ACM Transactions on Networking, vol. 8, No. 3, Jun. 2000, pp. 281-293.

Fisher, M.L., "The Lagrangian Relaxation Method for Solving Integer Programming Problems," Management Science, vol. 27, No. 1, Jan. 1981, 19 pages.

Garg, N. et al., "Faster and Simpler Algorithms For Multicommodity Flow And Other Fractional Packing Problems," SIAM Journal on Computing, vol. 37, No. 2, 2007, pp. 1-22.

Geoffrion, A.M., "Lagrangian Relaxation for Integer Programming," Chapter 9, 50 Years of Integer Programming, 1958-2008, pp. 243-281.

Guo, L. et al., "Does Internet Media Traffic Really Follow Zipf-like Distribution?" Proceedings of ACM Sigmetrics, 2007, 2 pages.

Huang, C. et al., "Can Internet Video-On-Demand Be Profitable?" Proceedings of ACM Sigcomm, 2007, 12 pages.

Koren, Y., "Factorization Meets The Neighborhood: A Multifaceted Collaborative Filtering Model," Proceedings of ACM KDD, 2008, 9 pages.

Lee, D. et al., "LRFU: A Spectrum Of Policies That Subsumes The Least Recently Used and Least Frequently Used Policies," IEEE Transactions on Computers, vol. 50, No. 12, Dec. 2001, pp. 1352-1361.

Qui, L. et al., "On The Placement Of Web Server Replicas," Proceedings of IEEE Infocom, 2001, 10 pages.

Spring, N. et al., "Measuring ISP Topologies With Rocketfuel," IEEE/ACM Transactions on Networking. vol. 12, No. 1, Feb. 2004, pp. 2-16.

Valancius, V. et al., "Greening The Internet With Nano Data Centers," Proceedings of ACM CoNext, 2009, 12 pages.

Zhao, Y. et al., "Network Bandwidth Requirements For Scalable On-Demand Streaming," IEEE/ACM Transcations on Networking, vol. 15, No. 4, 2007, pp. 1-10.

Zhou, X. et al., "Optimal Video Replication and Placement On A Cluster of Video-On-Servers," Proceedings IEEE International Conference on Parallel Processing, 2002, 9 pages.

\* cited by examiner

*WaFiL Algorithm*

Inputs  : Set of Movies (M), Storage capacity $C$

Outputs : $\bar{\lambda}_{WaFiL}$, $w_i$, $\forall i \in \mathbf{M}$

Function 310: SET $water\_level \leftarrow \min(1/\lambda_i)$, $i \in \mathbf{M}$ Function 320: INCREASE $water\_level$ UNTIL $\sum_{\{j\}\in \mathbf{M}} \min\left((water\_level - 1/\lambda_i)^+, T_i\right) = C$ Function 330: FOR each $\{i\} \in \mathbf{M}$ Function 332: $w_i \leftarrow \min\left((water\_level - 1/\lambda_i)^+, T_i\right)$ Function 334: IF $w_i$ = Length of Video $i$ THEN $\bar{\lambda}_i \leftarrow 0$ ELSE $\bar{\lambda}_i \leftarrow \min(1/water\_level, \lambda_i)$ Function 340: RETURN $\bar{\lambda}_{WaFiL} = \sum \bar{\lambda}_i$ AND $w_i$, $\forall i \in \mathbf{M}$

FIG. 3

*DWaFiL* Algorithm
Inputs : Set of Movies (M), Storage capacity $C$
Outputs : $\bar{\lambda}_{DWaFiL}^{k+1}$, chunk size, $w_i \; \forall i \in \mathbf{M}$ Function 410: SET $w_i = 0, \; \forall i \in \mathbf{M}$ Function 420: $StorageUsed \leftarrow 0$ Function 430: $\tilde{\mathbf{M}} = \mathbf{M}$ Function 440: WHILE $StorageUsed \leq C$ Function 442: FIND movie $j = \arg\max_i \left( \left. \left| \dfrac{\partial ERR_i^{k+1}(w)}{\partial w} \right| \right|_{w_i} \right), \; i \in \tilde{\mathbf{M}}$ Function 444: $w_j = w_j + Chunk$ Function 446: IF $w_j \geq$ Length of Movie $j$ a. $w_j =$ Length of Movie $j$ b. $\tilde{\mathbf{M}} = \tilde{\mathbf{M}} - \{j\}$ Function 448: $StorageUsed \leftarrow \sum_{i \in \mathbf{M}} w_i$ Function 450: FIND $ERR_i^{k+1}$ using (5) for all $w_i, i \in \mathbf{M}$ Function 460: RETURN $w_i, \forall i \in \mathbf{M}$ and $\bar{\lambda}_{DWaFiL}^{k+1} = \sum_{i \in \mathbf{M}} ERR_i^{k+1}$

FIG. 4

MULTI-STAGE BATCHING OF CONTENT DISTRIBUTION IN A MEDIA DISTRIBUTION SYSTEM

FIELD OF THE DISCLOSURE

The present disclosure is generally related to distribution of media content.

BACKGROUND

Demand for media content, such as Video-on-Demand (VoD) content, continues to rise. To accommodate the rise in demand for such media content, content providers are increasing content that is available on-demand. Most existing distribution systems distribute media content using unicast transmission as a delivery mechanism. While unicast transmission supports delivery of media content such as on-demand content, unicast transmission may not be the most efficient option for distribution of the media content as demand for content grows. For example, in unicast transmission, servers and network resources associated with a media distribution system scale linearly with the number of users requesting media content. Distribution of media content via unicast transmission may not be practical and may be costly due to the number of servers and network resources to support an increase in demand.

BRIEF DESCRIPTION OF THE DRAWINGS

FIG. 3 is a diagram illustrating logic steps of an algorithm to determine pre-population lengths of segments corresponding to a content item;

FIG. 4 is a diagram illustrating logic steps of an algorithm to determine pre-population lengths of segments corresponding to a content item;

DETAILED DESCRIPTION

Figure 1:
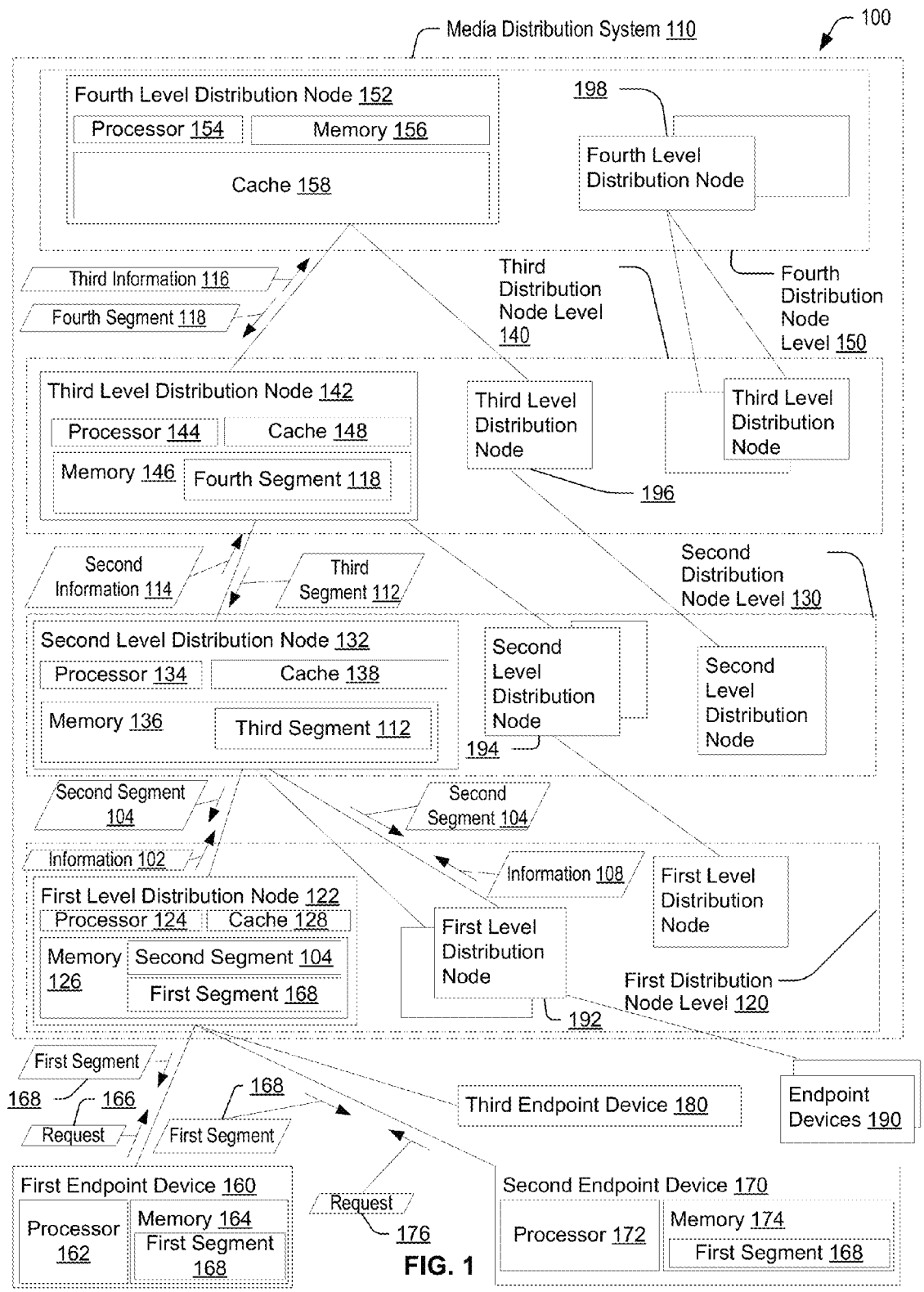
FIG. 1 is a diagram illustrating a first embodiment of a system for multi-stage batching of content distribution in a media distribution system.

A hierarchical media distribution system (HMDS) may distribute media content by multi-stage batching of content distribution to one or more endpoint devices (e.g., a set-top box device or a customer premises equipment device). The HMDS may include or be included within a content distribution network, an internet protocol distribution network, a mobile communication network, another network that can support hierarchical distribution, or a combination thereof. In multi-stage batching, a content item may be divided into segments for distribution. Each segment may include a subset of the content item that corresponding to a particular position or time sequence of each segment of the entire content item. That is, the segments together, in order, form the entirety of the content item. In multi-stage batching, each segment may be distributed (e.g., pre-positioned) at different distribution levels of the HMDS. In particular embodiments, each segment may be of equal size. Each segment may be distributed from a level of the HMDS that correspond to a position of the segment in relation to the time order.

To illustrate multi-stage batching of content distribution, a request for a content item may first be received, from an endpoint device, at a distribution node (e.g., a first level distribution node) within a lowest level (e.g., a first level) in the distribution hierarchy of the HMDS. For example, the HDMS may be implemented as an internet protocol television (IPTV) network, where each distribution level in the distribution hierarchy is distinct. A distribution node in the HMDS may include one or more servers of a video hub office (VHO), one or more servers of a central office (CO), one or more of a digital subscriber access line (DSLAM), one or more of a residential gateways (RG) device, one or more of a set-top box (STB) device, or a combination thereof. The servers or devices that implement the distribution node may vary based on a level of the distribution node within the HMDS.

In response to receiving the request, the first level distribution node may send a first segment (corresponding to a first position within the time order) of the content item to the endpoint device (e.g., a set-top box device or a residential gateway device). Alternatively, the first segment may be stored in a memory of the first level distribution node for immediate access. In a particular embodiment, the first level distribution node may include or may be implemented with one or more endpoint devices, which may each include the memory that stores the first segment. When the first segment is stored in the memory of an endpoint device, the first segment is not sent by the first level distribution node to the endpoint device because the first segment is accessible from the memory of the endpoint device. When the first level distribution node includes or is implemented with one or more endpoint devices that each includes memory that stores the first segment, the one or more endpoint devices access the first segment from memory in response to receiving a request for the content item associated with the first segment. The endpoint device can begin presentation of the content item by playing the first segment once the endpoint device has acquired (e.g., received from the first level distribution node, accessed from the memory of the first level distribution node) at least a portion of the first segment. In response to receiving the request for the first segment, the first level distribution node forwards the request or information related to the request to a higher level distribution node (e.g., a second level distribution node) in a higher distribution level (e.g., second level) of the HMDS to request remaining segments of the content item. Instead of immediately sending a second segment of the content item (corresponding to a next segment based on the time order sequence), the second level distribution node waits to distribute the second segment. For example, the second level distribution node waits during a distribution timeframe to send the second segment to the first level distribution node for distribution to the endpoint device. The distribution timeframe may be based on an end time of the first segment. Before the end of the distribution timeframe, the second level distribution node can aggregate forwarded requests from other first level distribution nodes for the second segment corresponding to the content item. The aggregated requests can be batched together by sending the second segment to each of the first level distribution nodes via a multicast transmission rather than via a unicast transmission for each individual request of the batch.

In response to receiving the forwarded request from the first level distribution node, the second level distribution node may forward the request or information related to the request to a higher level distribution node (e.g., a third level distribution node) in a higher distribution level (e.g., a third level) of the HMDS to receive remaining segments (e.g., a third segment, a fourth segment, etc.) of the content item. Instead of immediately sending the third segment of the content item, the third level distribution node waits to distribute the third segment. For example, the third level distribution node may wait during a second distribution timeframe to send the third segment. The second distribution timeframe may be based on the end time of the second segment. Until the end of the second distribution timeframe, the third level distribution node can aggregate requests from other second level distribution nodes for the third segment corresponding to the content item. The aggregated requests can be batched together by sending the third segment to each of the second level distribution nodes via a multicast transmission rather than via a unicast transmission for each individual request of the batch.

The methods performed at higher level distribution nodes (e.g., nth level distribution nodes) corresponding to higher distribution node levels (e.g., nth distribution node levels) in the HMDS are similar in manner as methods performed by second level distribution nodes at the second distribution level and third level distribution nodes at the third distribution level with respect to transmission of remaining segments of the content item. In this manner, the request or information related to the request for the content item is successively forwarded to the next higher distribution level in the hierarchical order of the HMDS. Each distribution node at each higher distribution level aggregates requests for a next segment in the time order until a corresponding distribution time is reached. A distribution timeframe for each higher distribution level may be based on when an end time of the previous segment at a lower distribution level will be reached. Thus, by aggregating requests for each segment (e.g., the first segment, the second segment, the third segment, etc.) of the content item at each particular level distribution node, the load on each distribution node of the HMDS is reduced because the aggregated requests can be batched together allowing for distribution of a segment via a multicast transmission.

A rate of aggregation achieved at a distribution node at each distribution node level may be related to whether the distribution node at each distribution node level stores a segment of a particular content item and the popularity of the particular content item. Aggregation may increase at the distribution nodes based on an increase in frequency of requests for segments of the particular content item. Popularity may be one factor that leads to an increase in frequency of requests for segments of a content item. Due to an increase in frequency of requests for a content item, distribution nodes may increase aggregation of requests, thereby batching distribution of segments of a particular content item via a multicast transmission. Whether a distribution node aggregates requests received for a segment may also be determined based on whether the distribution node is pre-populated with the segment. When the distribution does not have the segment, the distribution node may request the segment from a higher distribution level in the HMDS.

Pre-population of one or more segments of a set of content items may enable one or more requests to be batched together at one or more distributions levels within the HMDS. As a result of pre-population, a number of requests sent to higher distribution levels in the HMDS may be reduced when a segment is readily accessible upon request. The amount of batching that is achieved at each of the distribution levels may depend on arrival rate of requests for a content item and an amount of a content item (e.g., a number of segments) that may be pre-populated at one or more of the distribution node levels. The amount of the content item that is pre-populated may depend on popularity distribution of the content item and an amount of storage available at each of the distribution levels. The size of each of the segments of a content item may be determined based on an amount of storage available at each of the distribution levels and a predicted demand (e.g., popularity) for each of the content items. A greater number of requests may be more easily aggregated for the pre-populated segments of content items that have a higher popularity because content items having a higher popularity may be associated with higher request rates during any given period of time. An increase in requests during a period of time may increase a number or a portion of the requests that can be batched. In an embodiment, a size of each of the segments may be determined based on implementation of a water-filling algorithm ("WAFIL algorithm") which is based on adjusting a maximum size of one of the segments, where each of the segments are equal in size. The WAFIL algorithm may be used to determine a length of segments of a content item that may be distributed in segments via a plurality of distribution levels of in a HMDS. In another embodiment, the size of each of the segments may be determined based on implementation of a discrete-based water-filing algorithm ("DWAFIL algorithm"). The DWAFIL algorithm may account for expected viewer session length (e.g., an amount of time a viewer is expected to watch a particular content item) of the content item.

Multi-stage batching of content distribution may provide a scalable and cost efficient method to distribute media content. Additionally, multi-stage batching takes advantage of the available storage on network devices and the capabilities of the underlying distribution system.

In a particular embodiment, a method includes receiving, at a particular first level distribution node of a plurality of first level distribution nodes of a hierarchical media distribution system, a request for a content item from a first endpoint device of a plurality of endpoint devices. The content item is associated with segments corresponding to a particular time order. The method further includes, in response to receiving the request, sending, from the particular first level distribution node, a first data stream corresponding to a first segment of the content item to the first endpoint device. The method further includes, in response to receiving the request, sending, from the first level distribution node, first information to a particular second level distribution node of a plurality of second level distribution nodes of the hierarchical media distribution system. The first information indicates the request for the content item and a first end time corresponding to the first data stream. The method further includes receiving, from the particular second level distribution node, a second data stream corresponding to a second segment of the content item before the first end time of the first data stream has been reached. The method includes sending the second data stream to the first endpoint device.

In another particular embodiment, a system includes a processor and a memory accessible to the processor. The memory includes instructions that, when executed by the processor, cause the processor to perform a method including receiving, at a particular first level distribution node of a plurality of first level distribution nodes of a hierarchical media distribution system, a request for a content item from a first endpoint device of a plurality of endpoint devices. The content item is associated with segments corresponding to a particular time order. The method further includes, in response to receiving the request, sending, from the particular first level distribution node, a first data stream corresponding to a first segment of the content item to the first endpoint device. The method further includes, in response to receiving the request, sending, from the first level distribution node, first information to a particular second level distribution node of a plurality of second level distribution nodes of the hierarchical media distribution system. The first information indicates the request for the content item and a first end time corresponding to the first data stream. The method further includes receiving, from the particular second level distribution node, a second data stream corresponding to a second segment of the content item before the first end time of the first data stream has been reached. The method includes sending the second data stream to the first endpoint device.

In another particular embodiment, a computer-readable storage device including instructions that, when executed by a processor, cause the processor to perform a method including receiving, at a particular first level distribution node of a plurality of first level distribution nodes of a hierarchical media distribution system, a request for a content item from a first endpoint device of a plurality of endpoint devices. The content item is associated with segments corresponding to a particular time order. The method further includes, in response to receiving the request, sending, from the particular first level distribution node, a first data stream corresponding to a first segment of the content item to the first endpoint device. The method further includes, in response to receiving the request, sending, from the first level distribution node, first information to a particular second level distribution node of a plurality of second level distribution nodes of the hierarchical media distribution system. The first information indicates the request for the content item and a first end time corresponding to the first data stream. The method further includes receiving, from the particular second level distribution node, a second data stream corresponding to a second segment of the content item before the first end time of the first data stream has been reached. The method includes sending the second data stream to the first endpoint device.

Referring to FIG. 1, a diagram illustrating a first embodiment of a system 100 for multi-stage batching of content distribution in a media distribution system is shown. The system 100 includes a media distribution system 110 (MDS). The MDS 110 may be configured to distribute one or more content items to one or more endpoint devices, e.g., a first endpoint device 160, a second endpoint device 170, a third endpoint device 180, and endpoint devices 190. The one or more content items may include media content (e.g., a video-on-demand, content, a movie content, etc.). The MDS 110 may include or may be implemented as a hierarchical media distribution system (HMDS). The one or more content items may be provided by the MDS 110 based on a content distribution service that includes an internet protocol television (IPTV) service, a cable television service, a satellite television service, another service that provides content, or a combination thereof. The MDS 110 may include one or more media distribution networks, such as an internet protocol television (IPTV) distribution network, a content distribution network, a media distribution network, a mobile communication network, or a combination thereof.

The MDS 110 may include one or more distribution nodes. In the embodiment illustrated in FIG. 1, the MDS 110 is implemented as a HMDS. The HMDS implemented in the MDS 110 may include one or more levels of distribution nodes, each corresponding to a particular level of distribution located within the MDS 110 to provide support for distribution of the content items. The one or more levels of distribution nodes are represented in FIG. 1 by a first distribution node level 120, a second distribution node level 130, a third distribution node level 140, and a fourth distribution node level 150. Although four distribution node levels are shown, the HMDS implemented in the MDS 110 may include more or fewer levels of distribution nodes.

Each particular level of distribution nodes of the one or more levels of distribution nodes 120, 130, 140, 150 may be a parent level, a child level, or both. In a particular parent level, each distribution node of the particular parent is a parent distribution node that is coupled to one or more child distribution nodes of a child level of distribution nodes. A parent level in a HMDS may be higher in hierarchical order than a child level in the HMDS. The parent level may be closer to a source of transmission (storing content available from the MDS 110) within the HMDS than a child level. Conversely, a child level may be closer to endpoint devices than a parent level. In an illustrative example, in FIG. 1, the second distribution node level 130 is a parent level to the first distribution node level 120 which is a child level of the second distribution node level 130. The third distribution node level 140 is a parent level to the second distribution node level 130, which is a child level of the third distribution node level 140. The fourth distribution node level 150 is a parent level to the third level distribution 140, which is a child level of the fourth distribution node level 150. In this example, the fourth distribution node level 150 may be closest to a source of transmission within the MDS 110, while the first distribution node level 120 may be closest to the endpoints devices 160, 170, 180, 190. In a particular embodiment, the fourth level distribution nodes 150 may be a source of transmission. Each of the one or more levels of distribution nodes 120, 130, 140, 150 may be associated with a distinct logical and physical location within the MDS 110.

Each of the one or more levels of distribution nodes 120, 130, 140, 150 may include a plurality of distribution nodes. The first distribution node level 120 may include one or more first level distribution nodes represented by first level distribution nodes 122, 192. The second distribution node level 130 may include one or more second level distribution nodes represented by second level distribution nodes 132, 194. The third level distribution nodes 140 may include one or more third level distribution nodes represented by third level distribution nodes 142, 196. The fourth distribution node level 150 may include one or more fourth level distribution nodes represented by the fourth level distribution nodes 152, 198.

A distribution node in the MDS 110, such as a distribution node in each of the one or more levels of distribution nodes 120, 130, 140, 150, may include one or more servers of a VHO, one or more servers of a CO, one or more DSLAMs, one or more RG devices, one or more STB devices, or a combination thereof. A distribution node may include a processor, and a memory accessible to the processor. A portion of the memory may be designated or reserved for use as a cache. The cache may use a least recently used (LRU) policy. The memory may include instructions that are executable by the processor to cause the processor to perform one or more methods described herein as being performed by a distribution node. The memory may be used for pre-population of content items, which may include storing one or more content items, one or more segments of a particular content item, or both. The memory, the cache, or both may be used to store information, one or more segments, one or more content items, or a combination thereof received from another distribution node in the MDS 110. The information may include information indicating a request for a particular content item, an end time of a particular segment of a content item, other information associated with a content item or a segment, or a combination thereof.

In FIG. 1, the first level distribution node 122 may include a processor 124, a memory 126 accessible to the processor 124, and a cache 128. The memory 126 may include instructions that are executable by the processor 124 to cause the processor 124 to perform one or more methods described herein as being performed by the first level distribution node 122. The second level distribution node 132 may include a processor 134, a memory 136 accessible to the processor 134, and a cache 138. The memory 136 may include instructions that are executable by the processor 134 to cause the processor 134 to perform one or more methods described herein as being performed by the second level distribution node 132. The third level distribution node 142 may include a processor 144, a memory 146 accessible to the processor 144, and a cache 148. The memory 146 may include instructions that are executable by the processor 144 to cause the processor 144 to perform one or more methods described herein as being performed by the third level distribution node 142. The fourth level distribution node 152 may include a processor 154, a memory 156 accessible to the processor 154, and a cache 158. The memory 156 may include instructions that are executable by the processor 154 to cause the processor 154 to perform one or more methods described herein as being performed by the fourth level distribution node 152. Cache (e.g., the cache 128, the cache 138, the cache 148, and the cache 158) at one or more distribution nodes of each of the distribution levels may be managed based on a replacement policy, such as a least recently used (LRU) policy.

Each of the one or more endpoint devices 160, 170, 180, 190 may include a processor and a memory accessible to the processor. The memory may include instructions that are executable by the processor to cause the processor to perform one or more methods described herein as being performed by an endpoint device. For example, the first endpoint device 160 may include a processor 162 and a memory 164 that is accessible to the processor 162. The memory 164 may include instructions that are executable by the processor 162 to cause the processor 162 to perform one or more methods described herein as being performed by the first endpoint device 160. The second endpoint device 170 may include a processor 172 and a memory 174 that is accessible to the processor 172. The memory 174 may include instructions that are executable by the processor 172 to cause the processor 172 to perform one or more methods described herein as being performed by the second endpoint device 170. Each of the one or more endpoints 160, 170, 180, 190 may be configured to present one or more content items received from the MDS 110. Each of the one or more endpoint devices 160, 170, 180, 190 may be coupled to a device (e.g., a display device) that may be configured to receive a display input from the one or more endpoint devices 160, 170, 180, 190 to present one or more content items received from the MDS 110.

Each of the one or more endpoint devices 160, 170, 180, 190 may be coupled to one or more distribution nodes within the MDS 110. In FIG. 1, each of the endpoint devices 160, 170, 180, 190 may be coupled to one of the first level distribution nodes (e.g., the first level distribution nodes 122, 192). For example, the first endpoint device 160 and the second endpoint device 170 may be coupled to the first level distribution node 122.

The MDS 110 may distribute content (e.g., the content item) using multi-stage batching. Multi-stage batching of content distribution in the HMDS may include distribution of a content item to the endpoint devices 160, 170, 180, 190 in one or more segments. The one or more segments may be equal in length (e.g., a playback time) or may be unequal in length. The segments may be associated with a particular time order. In the example illustrated in FIG. 1, the content item may be divided into a plurality of segments including a first segment 168, a second segment 104, a third segment 112, and a fourth segment 118. The first segment 168 may correspond to a first time period according to the particular time order, the second segment 104 may corresponds to a second time period in the particular time order, the third segment 112 may correspond to a third time period in the particular time order, and the fourth segment may correspond to a fourth time period in the time order. The second time period may begin immediately after the first time period ends, the third time period may begin immediately after the second time period ends, and the fourth time period may begin immediately after the third time period ends. Thus, when played sequentially, the first segment 168, the second segment 104, the third segment 112, and the fourth segment 118 may form an entirety of the content item. Alternatively, the content item may include one or more additional segments (not shown).

In a particular embodiment, the segments of one or more content items may be pre-populated at one or more of distribution node levels 120, 130, 140, 150 within the MDS 110. The segments of the one or more content items may be pre-populated at one or more of the endpoint devices 160, 170, 180, 190. Pre-population of one or more segments of the content items may enable one or more requests to be batched together at one or more distributions levels 120, 130, 140, 150 within the MDS 110. An amount of aggregation of requests that may be batched for distribution may be based on segments that are pre-populated at each of the distribution levels (120, 130, 140, 150), at each of the endpoint devices (160, 170, 180, 190), or both. The segments that can be pre-populated at a distribution level 120, 130, 140, 150 or the endpoint devices 160, 170, 180, 190 may depend on a capacity of storage (e.g., memory) available at one or more distribution nodes of each of the distribution levels 120, 130, 140, 150. For example, at the first endpoint device 160, segments may be stored in the memory 164, and at the second endpoint device 170, segments may be stored in the memory 174. At the first distribution node level 120, segments may be stored in a memory of a first level distribution node (e.g., the memory 126 of the first level distribution node 122). At the second distribution node level 130, segments may be stored in a memory of a second level distribution node (e.g., the memory 136 of the second level distribution node 132). At the third distribution node level 140, segments may be stored in a memory of a third level distribution node (e.g., the memory 146 of the third level distribution node 142). At the fourth distribution node level 150, segments may be stored in a memory of a fourth level distribution node (e.g., the memory 156 of the fourth level distribution node 152). Accordingly, pre-population may be routinely performed based on demand.

Request batching that is achieved at each of the distribution levels may depend on arrival rate of requests for a content item and an amount of a content item (e.g., a number of segments) that may be pre-populated at one or more of the distribution node levels 120, 130, 140, 150. The amount of a content item that is pre-populated may depend on popularity distribution of the content item and an amount of storage (e.g., memory) available at each of the distribution levels 120, 130, 140, 150, as explained below. The size of each of the segments of a content item may be determined based on an amount of storage available at each of the distribution levels and a predicted demand (e.g., popularity) for the content items. A greater number of requests may be more easily aggregated for the pre-populated segments of content items that have a higher popularity because content items having a higher popularity may be associated with higher request rates during any given period of time. An increase in requests during a period of time may increase a number or portion of requests that are batched. Accordingly, memory of one or more distribution nodes at each of the distribution levels (e.g., the first distribution node level 120, the second distribution node level 130, the third distribution node level 140, and the fourth distribution node level 150) may be routinely modified to be pre-populated with segments of content items based on demand.

In a particular embodiment, a size of each of the segments corresponding to the particular time order for the content item may be determined based on implementation of a water-filling (WAFIL) algorithm. The WAFIL algorithm may determine a length of each segment of a content item that to be distributed. The segments that form the content item may be pre-populated at distribution nodes in one or more distribution levels of an HMDS. The WAFIL algorithm may determine length of the segments based on consideration of their placement within the distribution levels of the HMDS.

In another particular embodiment, the size of each of the segments corresponding to the particular time order may be determined based on implementation of a discrete water-filling (DWAFIL) algorithm. The DWAFIL algorithm accounts for expected viewer session length (e.g., an amount of time a viewer is expected to watch a particular content item) of the content item. The WAFIL algorithm and the DWAFIL algorithm are further described in additional detail below.

During operation, one or more endpoint devices 160, 170, 180 may send one or more requests to the MDS 110 for a particular content item. The one or more requests are represented in FIG. 1 by illustrative requests 166, 176 sent from the first endpoint device 160 and the second endpoint device 170, respectively. Each of the requests 166, 176 may include information identifying the content item. A particular node within a particular level of distribution nodes of the MDS 110 may receive the each of the requests 166, 176 from the endpoint devices 160, 170, respectively The requests 166, 176 may each be received by the first level distribution node 122 at the same time or at different times. The first level distribution node 122 may provide the first endpoint device 160 with the first segment 168 by sending a first data stream corresponding to the first segment 168 to the first endpoint device 160. In response to receiving the request 176, the first level distribution node 122 may provide the second endpoint device 170 with the first segment 168 by sending a first data stream to the second endpoint device 170. In a particular embodiment, the first segment 168 may be provided as a unicast transmission to each of the first endpoint device 160 and the second endpoint device 170. In another particular embodiment, the first segment 168 may be provided as a multicast transmission the first endpoint device 160 and the second endpoint device 170 when the requests 166, 176 are received within a particular time period.

Upon receiving the first segment 168 or at least a portion of the first segment 168 from the first level distribution node 122, the first endpoint device 160 may begin presentation (e.g., display) of the first segment 168. Upon receiving the first segment 168 or at least a portion of the first segment 168 from the first level distribution node 122, the first endpoint device 170 may begin presentation (e.g., display) of the first segment 168. In a particular embodiment, the first segment 168 may have been pre-populated in the memory 126 before the requests 166, 176 were received. In another particular embodiment, the first segment 168 may have been received from a higher level distribution node (e.g., the second level distribution node 132) in a higher distribution level (e.g., the second distribution node level 130) of the MDS 110 and stored in the cache 128 before the requests 166, 176 were received.

In a particular embodiment, the first level distribution node 122 may include or may be implemented with one or more endpoint devices (e.g., the first endpoint device 160, the second endpoint device 170, or both). In this embodiment, the first segment 168 may be stored (e.g., pre-populated) in a memory (e.g., the memory 164, the memory 174, or both) of one or more endpoint devices (e.g., the first endpoint device 160, the second endpoint device 170, or both). When the first segment 168 is stored in a memory of one or more endpoint devices, a request (e.g., the request 166 or the request 176) is not sent to the first level distribution node 122 from each of the one or more endpoint devices and, the first segment 168 is not sent from the first level distribution node 122 to the one or more endpoint devices (e.g., the first endpoint device 160 or the second endpoint device 170). Instead, the first segment 168 is accessed from the memory (e.g., the memory 164, the memory 174, or both) of the endpoint devices (e.g., the first endpoint device 160, the second endpoint device 170, or both) in response to a request (not shown) that is received at the one or more endpoint devices for the content item to which the first segment 168 belongs.

In response to receiving a request (e.g., the requests 166, 176) at a particular first level distribution node (e.g., the first level distribution node 122), the particular first level distribution node sends information 102 to a particular second level distribution node (e.g., the second level distribution node 132) to indicate the request (e.g., the request 166, 176). In a particular embodiment in which the first level distribution node 122 includes or is implemented with one or more endpoint devices (e.g., the first endpoint device 160, the second endpoint device 170, or both), the particular first level distribution node sends information 102 to a particular second level distribution node (e.g., the second level distribution node 132) to indicate a request (not shown) that is received at the one or more endpoint devices for the content item to which the first segment 168 belongs. The information 102 indicates the content item and a first end time of the first segment 168. For example, the first level distribution node 122 sends the information 102 (e.g., first information) to the second level distribution node 132. The information 102 may indicate the request 166,176 received at the particular first level distribution node for the content item. The information 102 may include a first end time associated with a first data stream providing the first segment 168 to each of the endpoint device 160, 170.

The first end time may be associated with a timeframe during which the second level distribution node 132 may provide the second segment to the first level distribution node 122. The second segment is associated with a second position in relation to the time order for the segments of the content item. The timeframe establishes when the first level distribution node 122 is to provide the second segment without encountering a delay in presentation of the content item. In another example, the first level distribution node 192 may send information 108 to the second level distribution node 132. The information 108 may indicate another request received at the first level distribution node 192 for the content item. The information 108 may include an end time associated with another first data stream providing a first segment to one of the endpoint devices 190. The end time may coincide with or be different from the first end time associated with the first data stream providing the first segment 168 based on when the request for the content item is received from the first level distribution node 122 and the first level distribution node 192. When the end time and the first end time are within a particular timeframe, the request 166 and the request 176 may be aggregated at the second level distribution node 132.

The particular first level distribution node (e.g., the first level distribution node 122, 192) may receive from the particular second level distribution node (e.g., the second level distribution node 132), a second data stream corresponding to a second segment (e.g., a second segment 104, 106) of the content item before an end time (e.g., the first end time) of the first data stream (corresponding to a first segment) has been reached. To illustrate, the first level distribution node 122 may receive from the second level distribution node 132 a second data stream corresponding to the second segment 104 of the content item before the first end time of the first data stream corresponding to the first segment 168. The second segment 104 may be stored at the first level distribution node 122 after receipt from the second level distribution node 132 before the second data stream is sent to the first endpoint device 160.

A particular first level distribution node may send a second data stream to a particular endpoint device. The second data stream may include a second segment of the content item. For example, the first level distribution node 122 may send a second data stream to the first endpoint device 160, the second endpoint device 170, or both. The second stream may include the second segment 104. That is, the second stream may be second stream corresponding to the second segment 104 received from the second level distribution node 132.

In a particular embodiment, before the first level distribution node 122 sends the first information 102, the first level distribution node 122 may determine whether the second segment 104 is stored in the memory 126 of the first level distribution node 122. When the second segment 104 is stored in the memory 126, the first level node 122 does not receive the second data stream from the second level distribution node 132. When the second segment 104 is not stored in the memory 126, the first level node 122 receives the second data stream (corresponding to the second segment 104) from the second level distribution node 132.

In a particular embodiment, the second stream sent from the first level distribution node 122 to the first endpoint device 160, the second endpoint device 170, or both may be an alternate second stream that includes the second segment 104 stored in the memory 126 when the second segment 104 is stored in the memory 126. The second stream may be a multicast transmission when the first requests 166,176 are received within the first end time of the first stream provided to the first endpoint device 160.

In a particular embodiment, the second data stream may be received via a multicast transmission when multiple requests for the second segment 104 are received within a particular timeframe. The particular timeframe may correspond to an end time of a particular first stream of the first segment 168 provided by the first level distribution node 122. The second stream may be sent as a multicast transmission to first level distribution nodes that are served by a particular second level distribution node and that received a particular request for the content item within a particular timeframe. For example, the second stream corresponding to the second segment 104 may be sent as a multicast transmission to the first level distribution node 122 and another first level distribution node 192, which are both served by the second level distribution node 132. In this example, the second level distribution node 132 may receive from the first level distribution node 122,192 the second information 102 and the second information 108, both indicating a request for the content item. The second information 108 may be received within a timeframe that ends at the end time of the first stream provided by the first level distribution node 122. When the first information 108 is received within the timeframe, the second stream may be provided as a multicast transmission stream. In another particular embodiment, the second data stream may be received by the first level distribution node 122 via a unicast transmission when no other first level distribution node served by the second level distribution node 132 receives a particular request for the content item within the timeframe. For example, the first level distribution node 122 may receive the second data stream via a unicast transmission when the other first level distribution nodes 192 served by the second level distribution node 132 does not receive a particular request for the content item within the timeframe that ends at the end time of the first data stream provided by the first level distribution node 122.

In response to the first information, the particular second level distribution node (e.g., the second level distribution node 132) sends second information (e.g., second information 114) to a third level distribution node (e.g., the third level distribution node 142). The second information 114 indicates the request (e.g., the request 166, 176) for the content item and a second end time of the second data stream. In response to the second information 114, the third level distribution node 142 may send a third data stream corresponding to a third segment 112 of the content item to the second level distribution node 132, which sends the third data stream to the first level distribution node 122 before the second end time has been reached. The first level distribution node 122 sends the third data stream to an endpoint device (e.g., the first endpoint device 160 or the second endpoint device 170).

In a particular embodiment, the third data stream is received at the first level distribution node 122 via a multicast transmission. The third level distribution node 142 sends the multicast transmission to one or more other first level distribution nodes that are served by one or more of the plurality of second level distribution nodes (e.g., the second level distribution node 194). The one or more of the plurality of second level distribution nodes may be served by the third level distribution node 142. The third level distribution node 132 may receive other third information indicating other requests for the content item within particular timeframe.

In a particular embodiment, before the particular second level distribution node (e.g., the second level distribution node 132) sends the second information (e.g., the second information 114), the particular second level distribution node may determine whether the third segment (e.g., the third segment 112) is stored in a memory (e.g., the memory 136) of the particular second level distribution node. The particular second level distribution node may not receive the third data stream from the particular third level distribution node when the third segment (e.g., the third segment 114) is stored in the memory of the particular second level distribution node. In this embodiment, the particular second level distribution node (e.g., the second level distribution node 132) may send an alternate third data stream to the particular first level distribution node (e.g., the first level distribution node 122) including the third segment. The third segment may be sent to other first level distribution nodes via a multicast transmission when information indicating other requests for the content item is received from other second level distribution nodes before the end time of the second data stream.

In response to the second information (e.g., the second information 114), the particular third level distribution node (e.g., the third level distribution node 142) sends third information (e.g., the third information 116) to a particular fourth level distribution node (e.g., the fourth level distribution node 152). The third information indicates the request (e.g., the request 166, 176) for the content item and a third end time of the third data stream. In response to the third information, the particular fourth level distribution node 152 may send a fourth data stream corresponding to a fourth segment 118 of the content item to the particular first level distribution node via the particular third level distribution node (e.g., the third level distribution node 142) and the particular second level distribution node (e.g., the second level distribution node 132) before the third end time has been reached. The particular first level distribution node sends the fourth data stream to an endpoint device (e.g., the first endpoint device 160 or the second endpoint device 170).

In a particular embodiment, before the particular third level distribution node (e.g., the third level distribution node 142) sends the third information (e.g., the third information 116), the particular third level distribution node may determine whether the fourth segment (e.g., the fourth segment 118) is stored in a memory (e.g., the memory 146) of the particular third level distribution node. The particular third level distribution node may not receive the fourth data stream from the particular fourth distribution node (e.g., the fourth distribution node 152) when the fourth segment (e.g., the fourth segment 118) is stored in the memory of the particular third level distribution node. In this embodiment, the particular third level distribution node (e.g., the third level distribution node 142) may send an alternate fourth data stream to the particular first level distribution node (e.g., the first level distribution node 122) including the fourth segment. The fourth segment may be sent to other first level distribution nodes via a multicast transmission when information indicating other requests for the content item is received from other third level distribution nodes (e.g., the third level distribution node 196) before the end time of the third data stream. A particular endpoint device (e.g., the first endpoint device 160 or the second endpoint device 170) may receive the content item by receiving each of the segments 168, 178, 104, 112, 118 from a particular first level distribution node (e.g., the first level distribution node 122) via one or more data streams (e.g., a multicast transmission or a unicast transmission)

Thus, aggregated bytes served may be reduced at one or more distributions nodes within one or more distribution levels within a HMDS by sending a segment via a multicast transmission for requests that are aggregated. When content (pre-populated at each of the distribution levels based implementation of the DWAFIL algorithm) is distributed based on multi-stage batching, the HMDS may achieve a rate of approximately twenty-seven percent corresponding to aggregation of requests. When content (pre-populated at each of the distribution levels based implementation of the WAFIL algorithm), the HMDS may achieve a rate of approximately twenty-two percent corresponding to aggregation of requests. Multi-stage batching may reduce an overall load on individual distribution nodes and may outperform other content distribution techniques such as caching and replication. Further, pre-population of high popularity content at lower distribution levels within the HMDS may enable the lower distribution levels to aggregate requests for the high popularity content, thereby preventing user requests from reaching higher distribution levels within the HMDS that affect an overall load on the individual distribution nodes.

Figure 2:
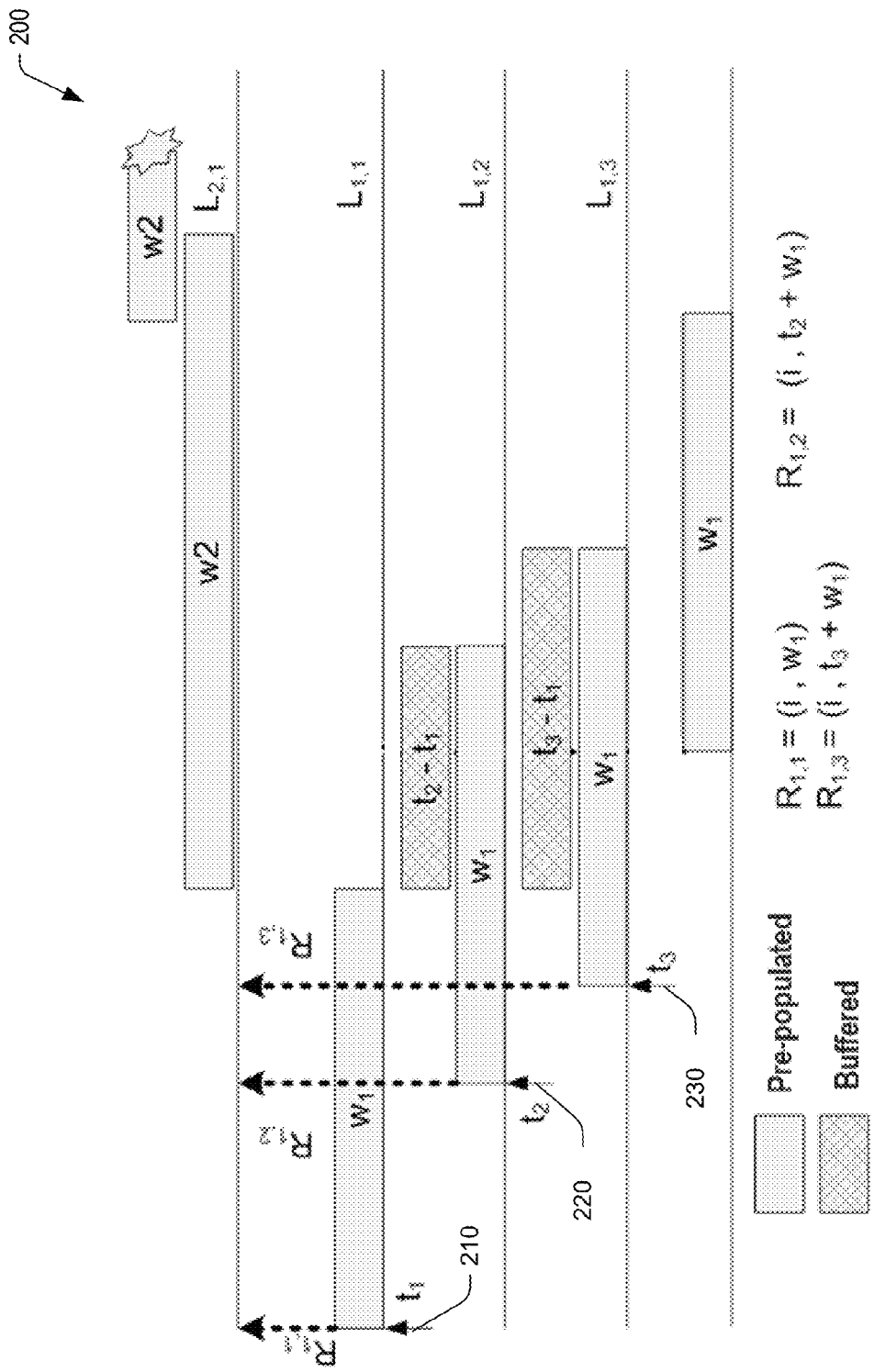
FIG. 2 is a diagram of a illustrative example of multi-stage batching of content distribution for a content item.

Referring to FIG. 2, a diagram 200 illustrating an illustrative example of multi-stage batching of content distribution for a content item is shown. In particular, the diagram 200 illustrates multi-stage batching of content distribution of a content item ($w_i$) (e.g., a video) from a hierarchical media distribution system (HMDS) to a plurality of users that request one or more content items (e.g., the content item $w_i$). The one or more requests may be received from endpoint devices connected to distribution nodes in a first level ($L_1$) of the HMDS. The HMDS includes two levels of distribution nodes, the first distribution level ($L_1$) and a second distribution level ($L_2$), where $L_2$ is a parent level to $L_1$. Distribution nodes of $L_1$ are represented by a first level distribution node $L_{1,1}$, a first level distribution node $L_{1,2}$, and a first level distribution node $L_{1,3}$. The second level distribution node $L_{2,1}$ represents a distribution node in the second distribution level $L_2$ and is a parent distribution node of node $L_{1,1}$, $L_{1,2}$, $L_{1,3}$. The first level distribution nodes $L_{1,1}$, $L_{1,2}$, and $L_{1,3}$ are each connected to at least one endpoint device. The illustrative example of the diagram 200 may be performed by the system 100 of FIG. 1, where the HMDS of FIG. 2 may correspond to the MDS 110 of FIG. 1. The first distribution level $L_1$ of FIG. 2 may correspond to the first distribution node level 120 of FIG. 1 and the second distribution level $L_2$ of FIG. 2 may correspond to the second distribution node level 130 of FIG. 1.

Each of the first level distribution nodes, e.g., the first level distribution nodes $L_{1,1}$, $L_{1,2}$, and $L_{1,3}$, may receive a request for the content item $w_i$ at a distinct time $t_1$ (210), time $t_2$ (220), and time $t_3$ (230), respectively. The content item $w_1$ is distributed to the endpoint devices in segments, corresponding to a first segment $w_1$ and a second segment $w_2$. The segments $w_1$ and $w_2$ correspond to a particular time order of the content item $w_i$, where the segment $w_1$ corresponds to a first time period of the segment $w_i$ and the segment $w_2$ corresponds to a second time period of the content item $w_i$ immediately after the first time period.

In the diagram 200, before distribution of the content item $w_i$, each of the segments $w_1$, $w_2$ is pre-populated at different nodes within different levels of the hierarchical media distribution system to facilitate multi-stage batching. For example, the segment $w_1$ may be pre-populated in the first level distribution nodes $L_{1,1}$, $L_{1,2}$, and $L_{1,3}$. The first level distribution node $L_{1,1}$ receives a first request $R_{1,1}$ at time $t_1$ (210). Upon receiving the request, the first level distribution node $L_{1,1}$ starts sending, to an endpoint device associated with $R_{1,1}$, a first data stream containing the first segment $w_1$ to be presented. The first level distribution node $L_{1,1}$ also sends the request $R_{1,1}$ to its parent node $L_{2,1}$. The request $R_{1,1}$ tells the parent node $L_{2,1}$ that the content item $w_i$ has been requested and a deadline at which $L_{2,1}$ has to start serving the segment $w_2$. The deadline is based on a time period defined by time $(t)=t_1+w_1$, where the period starts at $t_1$ (210) and ends at an end time associated with the segment $w_1$. When the second level distribution node $L_{2,1}$ receives information indicating the request $R_{1,1}$ for the content item $w_i$, the second level distribution node $L_{2,1}$ determines whether there are any pending requests for the content item i. In the diagram 200 of FIG. 2, there are no pending requests at time $t_1$ (210) for the content item $w_i$ and the second level distribution node $L_{2,1}$ schedules distribution of the segment $w_2$ to $L_{1,1}$ by the deadline.

Subsequently, endpoint devices attached to first level distribution node $L_{1,2}$ and the first level distribution node $L_{1,3}$ each request ($R_{1,2}$ and $R_{1,3}$) the same content item $w_i$ at times $t_2$ (220) and $t_3$ (230), respectively. Each request ($R_{1,2}$ and $R_{1,3}$) occurs before the deadline corresponding to time t when $L_{2,1}$ has to start serving the segment $w_2$. In response to receiving the requests $R_{1,2}$ and $R_{1,3}$, the first level distribution node $L_{1,2}$ and the first level distribution node $L_{1,3}$ each send a first data stream containing the first segment $w_1$ to the endpoint devices (associated with requests $R_{1,2}$ and $R_{1,3}$) for presentation. Because distribution is scheduled for the content item $w_i$ corresponding to the $R_{1,1}$, and the requests $R_{1,2}$ and $R_{1,3}$ are received before deadline for distribution of the content item $w_i$, the second level distribution node $L_{2,1}$ batches the requests ($R_{1,2}$ and $R_{1,3}$) with the original request $R_{1,1}$. The second level distribution $L_{2,1}$ serves the content $w_i$ at time t using a single multicast transmission. The first level distribution nodes $L_{1,2}$ and $L_{1,3}$ receive the multicast transmission at the deadline time t and buffer the portions of the video until required for the playback. The first level distribution node $L_{1,2}$ buffers the segment $w_2$ for the time period based on the difference between time $t_2$ (220) and time $t_1$ (210). The first level distribution node $L_{1,3}$ buffers the segment $w_2$ for the time period based on the difference between time $t_3$ (230) and time $t_1$ (210). These buffers may be continuously updated by the multicast transmission and drained by playback at each of the endpoint devices attached to the first level distribution nodes until the sessions are terminated by the users.

In an alternate scenario, if the first level distribution node $L_{1,2}$ and the first level distribution node $L_{1,3}$ did not receive the requests $R_{1,2}$ and $R_{1,3}$ for the content item $w_i$ before the deadline time t, the second level distribution node $L_{2,1}$ would have delivered the segment $w_2$ to the first level distribution node $L_{1,1}$ via a unicast transmission. Similarly if a new request arrives at the second level distribution node $L_{2,1}$ after the content item $w_2$ is being sent via a transmission stream, the second level distribution node $L_{2,1}$ schedules a new transmission at the deadline time t associated with the new request. If ongoing transmission of the segment $w_2$ from a first level distribution node is prematurely terminated by an endpoint device, the first level distribution node may notify a parent distribution node (e.g., the second level distribution node $L_{2,1}$). For example, the first level distribution node may send a "leave" message to terminate the ongoing transmission of the segment $w_2$. If an endpoint device with the earliest deadline sends the message to terminate the transmission, the new transmission is rescheduled to a new deadline time of a next active request. For example in FIG. 2, if the first level distribution node $L_{1,1}$ leaves the system before the deadline time t, the second level distribution node $L_{2,1}$ reschedules the delivery time of the second segment to the next active request based on $R_{1,2}$, which is $t=t_2+w_1$. If the first level distribution node $L_{1,1}$ leaves after the streaming starts, the second level distribution node $L_{2,1}$ continues streaming to the other recipients (if any).

Referring to FIG. 3, a diagram illustrating logic steps of an algorithm 300 to determine pre-population lengths of segments corresponding to a content item (e.g., a movie) is illustrated. The algorithm 300 is a water-filling algorithm ("WAFIL algorithm") that iteratively adjusts a maximum length of each segment of a content item (e.g., a movie). The WAFIL algorithm 300 may be performed by a first level distribution node (e.g., the first level distribution node 122 of FIG. 1) in the MDS 110, a second level distribution node (e.g., the second level distribution node 132) in the MDS 110, a third level distribution node (e.g., the third level distribution node 142) in the MDS 110, a fourth level distribution node (e.g., the fourth level distribution node 152) of the MDS 110, another computing device (not shown in FIG. 1), or a combination thereof. The WAFIL algorithm 300 may determine a length of segments of a content item that is being distributed in segments from a plurality of distribution levels of a hierarchical media distribution system ("HMDS") (e.g., the MDS 110 of FIG. 1). The segments that form the content item may be pre-populated at distribution nodes in one or more distribution levels of the HMDS. The WAFIL algorithm 300 may determine length of the segments based on consideration of placement of the segments within the distribution levels of the HMDS. The WAFIL algorithm 300 is performed with respect to a particular single distribution level (e.g., the first distribution node level 120 of FIG. 1, the second distribution node level 130, the third distribution node level 140, or the fourth distribution node level 150) of the HMDS.

The WAFIL algorithm 300 may be used to determine pre-population lengths of segments of a content item by first applying the WAFIL algorithm 300 for a lowest level (e.g., the first distribution node level 120 of FIG. 1) in a HMDS. Subsequently, the WAFIL algorithm 300 may be used to determine pre-population lengths of segments by applying the WAFIL algorithm 300 to each higher level (e.g., the second distribution level 130, the third distribution node level 140, or the fourth distribution node level 150) in the HMDS. The WAFIL algorithm 300 is based on an assumption that segments will be pre-populated symmetrically in the HMDS. That is, each segment at a particular distribution level of the HMDS has the same length. The WAFIL algorithm 300 assumes that average request arrival rates at a particular distribution level change throughout a day, thus the average request arrival rate used in the WAFIL algorithm 300 is based on a maximum mean request arrival rate for a particular day based on 30 minute sub-intervals.

The WAFIL algorithm 300 uses input indicating a set of movies (M) and a storage capacity (C) per node at a particular distribution node level in the HMDS for which the WAFIL algorithm 300 is being used to determine pre-population lengths of segments. At Function 310 of the WAFIL algorithm 300, a water level (water_level) constant is determined for use in the remaining steps of the WAFIL algorithm 300. The water_level may be determined based on the following logic:

$$\text{SET water\_level} \leftarrow \min(1/\lambda_i), i \in M \quad \text{(Function 310)}$$

where, i represents a particular movie of a set of movies M; and
where, $\lambda_i$ is an average request arrival rate of the particular movie i.

The water_level is set based on a smallest value of $1/\lambda_i$ for each particular movie i of the set of movies M.

At Function 320, an iteration is performed to determine a storage utilization value for the set of movies M based on the water_level, where on each iteration the water_level is increased until the storage utilization value is equal to the storage capacity C. Function 320 may be performed based on the following logic:

```
INCREASE water_level                                    (Function 320)
        UNTIL  ∑  min((water_level − 1/λᵢ)⁻, Tᵢ) = C
              {i}=M
``` where water_level is the water level set in Function 310;
where M is the set of movies;
where i is a particular movie in the set of movies M;
where C is a storage capacity per node at a particular distribution node level in the HMDS;
where $T_i$ is time remaining for a segment of a particular movie i after other segments of the particular movie i have been populated at any lower levels (if any exist);
where, $\lambda_i$ is the average request arrival rate of the particular movie i;
where (water_level−1/$\lambda_i$)⁺ represents a positive difference between the water_level and 1/$\lambda_i$, that is the difference is 0 if (water_level−1/$\lambda_i$)<0; and
where min((water_level−1/$\lambda_i$)⁺, $T_i$) represents a minimum (least) value between the $T_i$ and (water_level−1/$\lambda_i$)⁺.

Function 320 is iteratively performed by incrementing the water_level for each successive iteration of Function 320. A result of Function 320 is a summation (Σ) of the minimum value ((water_level−1/$\lambda_i$)⁺, $T_i$) for each particular movie i. The minimum value ((water_level−1/$\lambda_i$)⁺, $T_i$) for each particular movie i represents a length of a segment for the particular movie i based on the current water_level. The summation represents a total length of each segment of each of the set of movies M. Function 320 is iteratively performed until the summation in a particular iteration equals to the storage capacity C, where each segment of each of the set of movies maximizes the storage capacity of a node.

At Function 330, an iteration is performed for each particular movie i of the set of movies M to determine a minimum segment length of each movie i based on the water_level determined at Function 320 and to determine a new average request arrival rate corresponding to the minimum segment length. Function 330 may be performed according to the following logic:

```
FOR each {i} ∈ M                                         (Function 330)
    wᵢ ← min ((water_level − 1/λᵢ)⁺, Tᵢ)
    IF wᵢ = Length of Video i THEN λ̄ᵢ ← 0
    ELSE λ̄ᵢ ← min(1/water_level, λᵢ)
``` where $w_i$ is a length of a segment of the particular movie i;
where $T_i$ is the time remaining for a segment of a particular movie i after other segments of the particular movie i have been populated at any lower levels (if any exist);
where $\lambda_i$ is the average request arrival rate of the particular movie i;
where (water_level−1/$\lambda_i$)⁺ represents the positive difference between the water_level and 1/$\lambda_i$;
where min((water_level−1/$\lambda_i$)⁺, $T_i$) represents the minimum (least) value between the $T_i$ and (water_level−1/$\lambda_i$)⁺;
where Length of video i is the length of the particular movie i;
where $\bar{\lambda}_i$ is a new average request arrival rate for the particular movie i; and
where min(1/water_level, $\lambda_i$) represents a minimum (least) value between the $\lambda_i$ and 1/water_level.

Function 330 determines a segment length for each particular movie i of the set of movies M. Function 332 of the Function 330 determines a minimum segment length for a particular movie i based on the water_level determined at Function 320. Function 334 of the Function 330 determines a new average request arrival rate based on the minimum segment length and the water_level determined at Function 320. At Function 334, the new average request arrival rate $\bar{\lambda}_i$ may be set to 0 when the minimum segment length is equal to a length of the particular movie i. Because the movie i has only one segment, the request is served because the entire movie is provided to a requestor when the segment $w_i$ is sent. The new average request arrival rate $\bar{\lambda}_i$ may be the minimum value between the $\lambda_i$ and 1/water_level.

At Function 340, a new average request arrival rate representative of all movies in the set of movies M is determined Function 340 produces a result indicating a minimum segment length determined at Function 332 for each movie i of the set of movies M. Function 340 may be performed by the following logic:

```
RETURN λ̄_WAFIL=Σλ̄ᵢ AND wᵢ, ∀i∈M                        (Function 340)
``` where $\bar{\lambda}_{WAFIL}$ is an average request arrival rate for all of the movies M;
where $\Sigma\bar{\lambda}_i$ is a summation of each new average request arrival rate $\bar{\lambda}_i$ for each particular movie i determined at Function 334;
where $w_i$, $\forall i \in M$ represents a segment length of each movie i in the set of movies M.

At the Function 340, the average request arrival rate $\bar{\lambda}_{WAFIL}$ for all the movies M is determined based on $\Sigma\bar{\lambda}_i$. The Function 340 returns the average request arrival rate and the segment length $w_i$ for each movie i in the set of movies M. The average request arrival rate for all the movies represents a scaled down effective request arrival rate for a node corresponding to the specific level in consideration by the WAFIL algorithm 300. WAFIL algorithm 300 determines the average request arrival rate before proceeding to another higher distribution level because, when the movie segments are populated for a particular level requests can be batched, thereby reducing the effective request arrival rates for upper distribution levels.

Referring to FIG. 4, a diagram illustrating logic steps of an algorithm 400 to determine pre-population lengths of segments corresponding to a content item (e.g., a movie) is illustrated. The algorithm 400 is a discrete-based water-filling algorithm ("DWAFIL algorithm") that accounts for expected viewer session length (e.g., an amount of time a viewer is expected to watch a movie) of the content item. The DWAFIL algorithm 400 may be performed by a first level distribution node (e.g., the first level distribution node 122 of FIG. 1) in the MDS 110, a second level distribution node (e.g., the second level distribution node 132) in the MDS 110, a third level distribution node (e.g., the third level distribution node 142) in the MDS 110, a fourth level distribution node (e.g., the fourth level distribution node 152) of the MDS 110, another computing device (not shown in FIG. 1), or a combination thereof. The DWAFIL algorithm 400 accounts for session distribution, by filling up the storage at each level using chunks of data for a movie until storage capacity of a node is saturated. The DWAFIL algorithm 400 may determine a length of segments of a content item that is being distributed in segments from a plurality of distribution levels of a HMDS (e.g., the MDS 110 of FIG. 1). The segments that form the content item may be pre-populated at distribution nodes in one or more distribution levels of the HMDS. The DWAFIL algorithm 400 may determine length of the segments based on consideration of placement of the segments within the distribution levels of the HMDS. The DWAFIL algorithm 400 is performed with respect to a particular single distribution level (e.g., the first distribution node level 120 of FIG. 1, the second distribution node level 130, the third distribution node level 140, or the fourth distribution node level 150) of the HMDS.

The DWAFIL algorithm 400 may include an assumption that segments will be pre-populated symmetrically in the HMDS, so each segment at a particular distribution level has the same length. The DWAFIL algorithm 400 may also include an assumption that average request arrival rates at a particular distribution level change throughout a day. Thus, the average request arrival rate used in the DWAFIL algorithm 400 may be based on a maximum mean request arrival rate for a particular day based on 30 minute sub-intervals.

The DWAFIL algorithm 400 uses an input specifying a set of movies (M) and a storage capacity (C) per node at a particular distribution node level in the HMDS for which the DWAFIL algorithm 400 is being used to determine pre-population lengths of segments.

At Function 410 of the DWAFIL algorithm 400, a segment length $w_i$ of each particular movie i of the set of movies M is set to zero, which is represented by:

SET $w_i=0, \forall i \in M$ (Function 410)

where $w_i$ is a length of a segment of the particular movie i; and where $\forall i \in M$ represents each movie i in the set of movies M.

At Function 420, utilized storage (StorageUsed) of the storage capacity C is initialized to 0, which is represented by:

StorageUsed←0 (Function 420)

At Function 430, an adjustable set of movies $\tilde{M}$ (is defined) that will be used in the DWAFIL algorithm 400, which is represented by:

$\tilde{M}=M$ (Function 430)

At Function 440, an iterative loop based on the condition, WHILE StorageUsed≤C, is performed. The following logic illustrates the Function 440:

---

WHILE StorageUsed ≤ C a. FIND movie $j = \arg\max_i \left( \frac{\partial ERR_i^{k+1}(w)}{\partial w} \bigg|_{w_i} \right), t \in \tilde{M}$ b. $w_j = w_j + $ Chunk
c. IF $w_j \geq$ Length of Movie j
   a. $w_j = $ Length of Movie j
   b. $\tilde{M} = \tilde{M} - \{j\}$ d. StorageUsed $\leftarrow \sum_{i \in M} w_i$ (Function 440)

---

The following logic is performed for Function 442 of Function 440:

FIND movie $j = \arg\max_i \left( \frac{\partial ERR_i^{k+1}(w)}{\partial w} \bigg|_{w_i} \right), t \in \tilde{M}$ (Function 442)

$ERR_i^{k+1}(w) = \begin{cases} 0; & w_i \geq T_i \\ \dfrac{1}{w_i^k + \dfrac{1}{\lambda_i^k \left(1 - F\left(w_i^k + \sum_{j<k} w_i^j\right)\right)}}; & \text{otherwise} \end{cases}$ where FIND selects a movie j from the set of movies $\tilde{M}$ based on a result of the function (arg max);

where k corresponds to a distribution level under consideration by the DWAFIL algorithm 400;
where $ERR_i^{k+1}(w)$ is an average effective request rate (ERR) of movie i seen by a parent node in a distribution level (e.g., k+1);
where $\lambda_i^k$ is an average request arrival rate for a particular movie i at the distribution level k;
where $w_i^k$ is a segment length of a particular movie i at a distribution level k;
where $$F\left(w_i^k + \sum_{j<k} w_i^j\right)$$

is a cumulative distribution function of viewer session lengths; and
where $T_i$ is time remaining for a segment of a particular movie i after other segments of the particular movie i have been populated at any lower levels (if any exist).

At Function 442, a movie j selected based on determining a movie i from the set of movies $\tilde{M}$ that is identified for (arg max).

At Function 444 of the Function 440, a segment size of a movie ($w_j$) to be stored in storage at the node is incremented based on a chunk (size) of storage at the node. The following logic illustrates part b:

$w_j = w_j + $ Chunk (Function 444)

The following logic is performed at Function 446 of the Function 440:

---

IF $w_j \geq$ Length of Movie j (Function 446)
   $w_j = $ Length of Movie j
   $\tilde{M} = \tilde{M} - \{j\}$

---

At Function 446, when the segment $w_j$ is greater than or equal to an entire length of the movie j, the current segment length of movies to be stored at the node is incremented based on the length of the movie j, and the movie j is removed from the set of movies $\tilde{M}$.

The following logic is performed at Function 448 of the Function 440:

$StorageUsed \leftarrow \sum_{i \in M} w_i$ (Function 448)

At Function 448, StorageUsed is updated for the current iteration of Function 440 based on a summation of length of each segment $w_i$ of each movie i in the set of movies M.

At Function 450, an average ERR of movie i is determined for each segment $w_i$ of each movie i in the set of movies M. The following logic illustrates the Function 450:

FIND $ERR_i^{k+1}$ using (5) for $w_i, i \in M$ (Function 450)

where $ERR_i^{k+1}$ is the average ERR of movie i seen by the parent node (k+1) in a distribution level;
where $w_i$ is a length of a segment of the particular movie i; and
where $\forall i \in M$ represents each movie i in the set of movies M.

At Function 460, a segment $w_i$ of each movie i in the set of movies M is determined. Also at Function 460, an average request arrival rate for a particular distribution level k+1 is determined. The following illustrates the logic of 460:

RETURN $w_i$, $\forall\, i \in M$ and $\bar{\lambda}_{DWaFiL}^{k+1} = \sum_{i \in M} ERR_i^{k+1}$ (Function 460)

where $w_i$ is the length of the segment of the particular movie i;
where $\forall i \in M$ represents each movie i in the set of movies M;
where $\bar{\lambda}_{DWaFiL}^{k+1}$ is an average request arrival rate for a particular distribution level k+1; and
where $$\sum_{i \in M} ERR_i^{k+1}$$

is a summation of an average ERR for each movie i of the set of movies M.

In summary, the DWAFIL algorithm 400 begin with a zero length for all movies i and iteratively assigns one chunk of storage to a movie i until the storage capacity C is saturated. The movie i to which the chunk is allocated is the movie i which is not yet fully populated and has a greatest resulting summation of the average ERR among all ERR functions at the current allocation of portion lengths.

Figure 5:
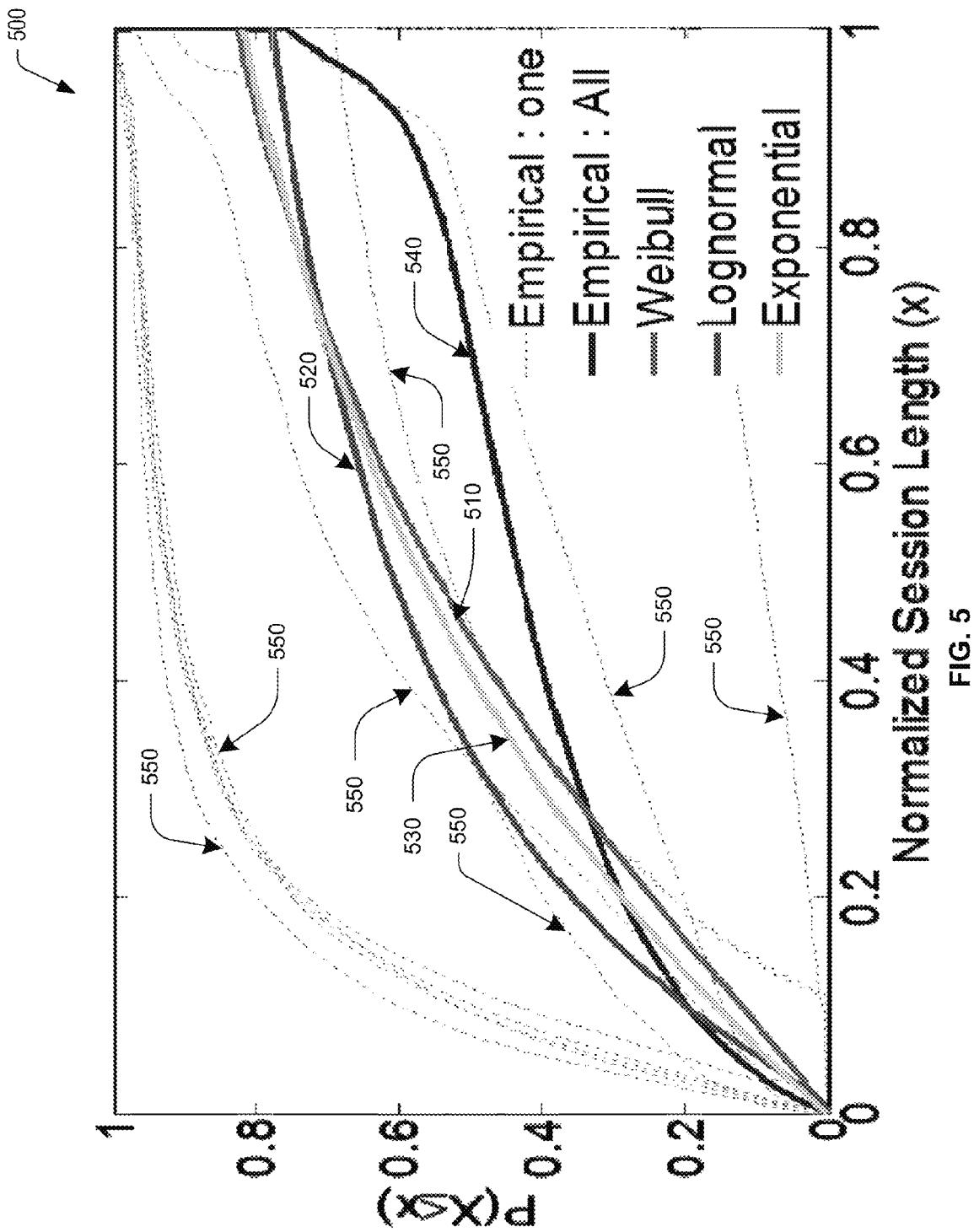
FIG. 5 is a graph illustrating sample data related to viewer session length probability distribution.

Referring to FIG. 5, a graph 500 of sample data related to viewer session length distribution is illustrated. The graph 500 illustrates probability distribution functions related to viewer session length (i.e., an amount of time a viewer is expected to watch a movie) of movies, distributed by a video-on-demand system, that are viewed during a sample time period. The sample data is based on data collected from a large, in-service, video-on-demand system during the sample time period. Various analyses were performed using the sample data to determine effects of using various content distribution schemes. The line 510 illustrates a Weibull probability distribution corresponding to viewer session length based on a normalized session length (x) for the sessions of movies that were viewed. The line 520 illustrates Lognormal probability distribution corresponding to viewer session length based on a normalized session length (x) for the sessions of movies that were viewed. The line 530 illustrates Exponential probability distribution corresponding to viewer session length based on a normalized session length (x) for the sessions of movies that were viewed. The line 540 illustrates an empirical probability distribution corresponding to viewer session length of movies that were viewed. Each of the lines 550 illustrates an empirical probability distribution corresponding to viewer session length of one of ten most popular movies during the sample time period. Knowledge of probability distribution of viewer session length may be used to perform pre-population of content following the DWAFIL algorithm 400 of FIG. 4. The DWAFIL algorithm 400 may be implemented based on results corresponding to the Weibull probability distribution illustrated by line 510. In using the Weibull probability distribution, it is assumed that viewer sessions lengths of all movies are identical. The DWAFIL algorithm 400 may be implemented based on results corresponding to other probability distribution functions and may not depend on the viewer session length distribution being equal for different movies.

Figure 6:
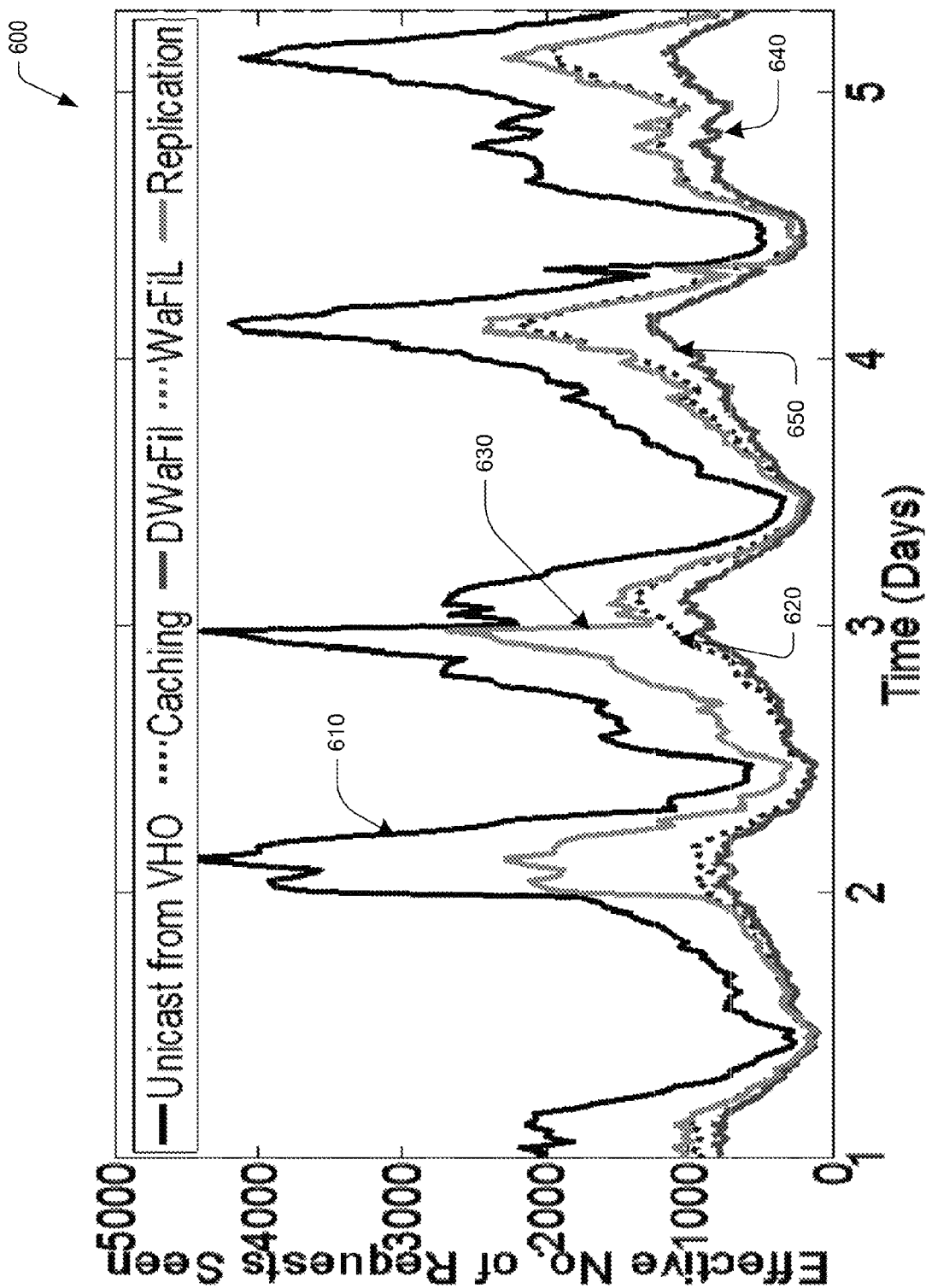
FIG. 6 is a graph illustrating sample data related to number of requests at a video hub office within a media distribution system.

Referring to FIG. 6, a graph 600 of sample data related to a number of requests at a video hub office within a media distribution system (e.g., a video-on-demand (VHO) system) is illustrated. The sample data is based on data collected from a large, in-service, video-on-demand system during a sample time period of five days (including weekend days) at a VHO of the VOD system. The sample data was gathered after the video-on-demand system had been operational for three days. The sample data includes hundreds of thousands of user sessions initiated by tens of thousands of user sessions initiated by tens of thousands of users. The video-on-demand system used to gather the sample data includes a few thousand DSLAMs and hundreds of COs. The total library size of the content video on demand system was not known at the time the sample data was gathered, but the sample data was based on requests for thousands of videos of various types including music videos, trailers, TV shows, and full-length movies.

Various analyses were performed using the sample data to determine effects of using various content distribution schemes. For purposes of analyzing the sample data, certain assumptions were made, including that all videos are high definition with streaming rate of 10 Mbps. The analyses also included an assumption that storage capacities available in L1, L2 and L3 had a size of 0.25%, 1.5% and 4% of the capacity required to store all the active videos. The size of a complementary cache at a node in the video-on-demand system was assumed to be ten percent of the storage capacity available in that node (unless otherwise noted for a particular analysis). Implementation of the DWAFIL algorithm 400 of FIG. 4, for pre-population in the video-on-demand system to analyze the sample data, was based on an assumption of the Weibull distribution having a shape parameter of 1.21 and a scale parameter of 0.43. Implementation of the DWAFIL algorithm 400 of FIG. 4 and the WAFIL algorithm 300 of FIG. 3 for pre-population in the video-on-demand system to analyze the sample data may be based on determining a maximum mean request arrival rate for a particular day based on 30 minute sub-intervals. The VOD system from which the sample data was gathered implemented a least frequently used (LFU) cache replacement policy for cache content management. The VOD system also used a least recently used (LRU) cache policy as a tie-breaking policy. The RG devices in the video-on-demand system did not use cache to store one or more videos.

The graph 600 illustrates a number of requests received at a VHO of the VOD system for different distribution techniques seen over a period of five days (including a weekend). The number of requests was binned every 30 minutes. The number of requests received is a measure used to determine effective request rate (ERR). The sample data associated with a line 610 corresponds to a number of requests at the VHO of the VOD system that distributes content via unicast transmission. The sample data associated with a line 620 corresponds to a number of requests at the VHO of the VOD system that distributes content using a caching technique. The sample data associated with a line 630 corresponds to a number of requests at the VHO of the VOD system that distributes content using a replication technique. The sample data corresponding to the line 630 was determined based on a number of requests from a previous day. The sample data associated with a line 640 corresponds to a number of requests at the VHO of the VOD system that distributes content using multi-stage batching where content is pre-populated using the DWAFIL algorithm 400 of FIG. 4. The sample data associated with a line 650 corresponds to a number of requests at the VHO of the VOD system that distributes content based on implementation of multi-stage batching where content is pre-populated using the WAFIL algorithm 300 of FIG. 3.

A comparison of the sample data corresponding to the lines 610, 620, and 630 to the lines 640 and 650 reveals that an effective number of requests over five days may be lowest at the VHO when distribution is based on implementation of the DWAFIL algorithm 400 of FIG. 4 and the WAFIL algorithm 300 of FIG. 3. A closer review of the sample data reveals that replication and caching techniques exhibit a reduction in the load of the number of requests by about fifty percent, while the WAFIL algorithm 300 and DWAFIL algorithm 400 lead to a reduction in the number of requests by about seventy-five percent. A reduction in the number of requests is greatest at a root of a HMDS, so the number of requests at the VHO illustrates an accurate rate at which multicast or unicast is served from servers for the entire HMDS.

Figure 7A:
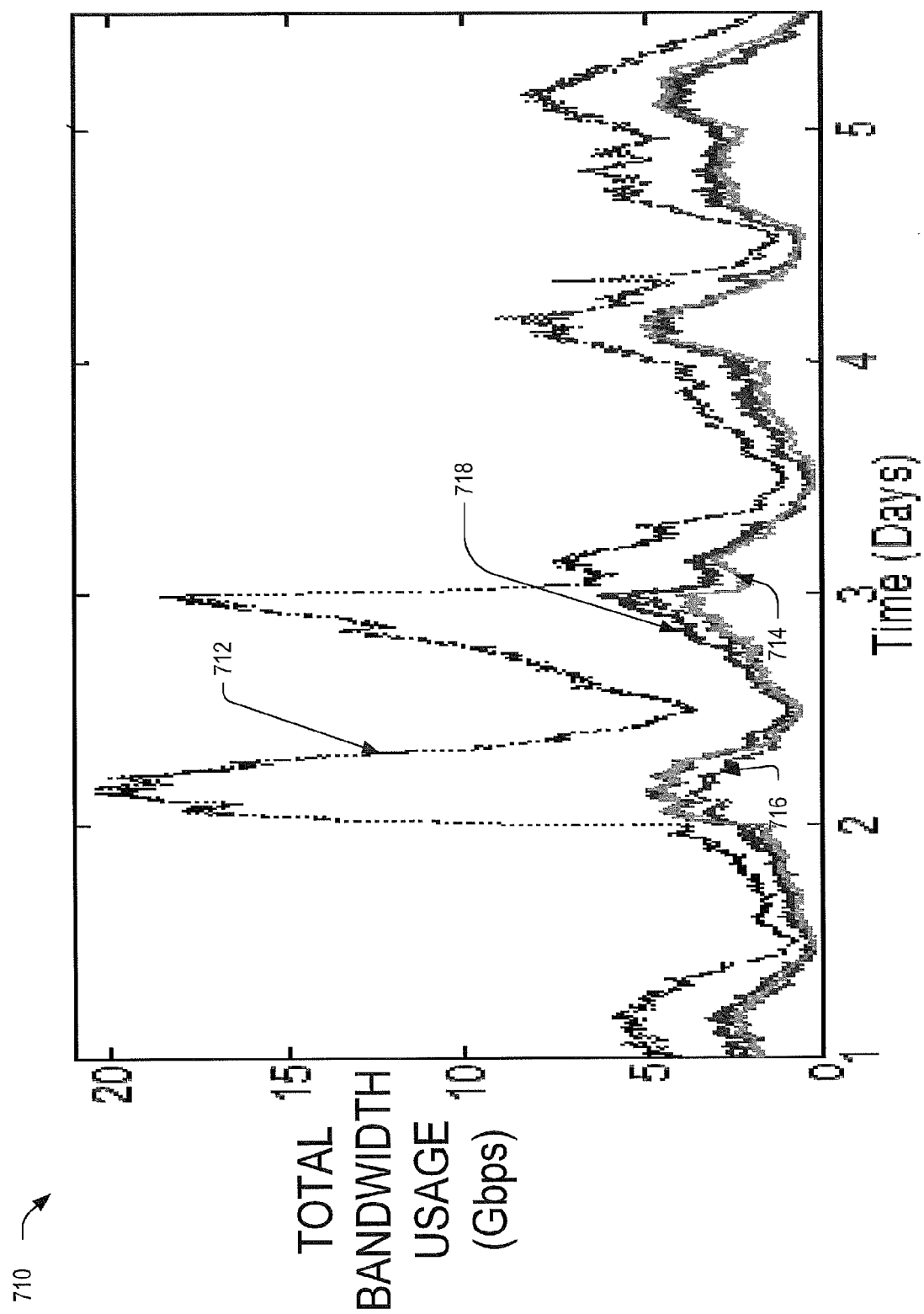
FIGS. 7A-C are graphs illustrating sample data related to total server bandwidth utilization at different levels within a media distribution system.
Figure 7B:
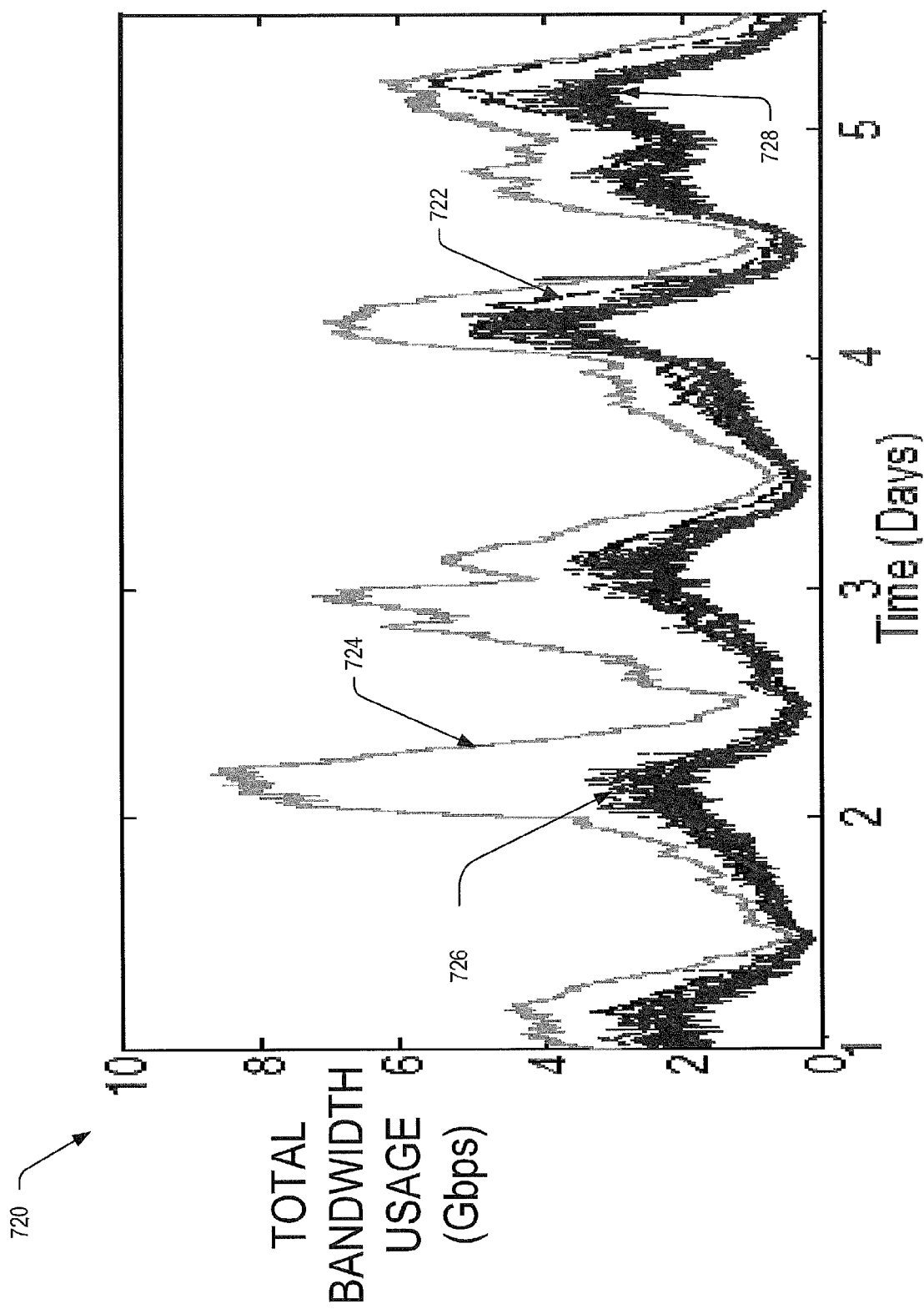
Figure 7C:
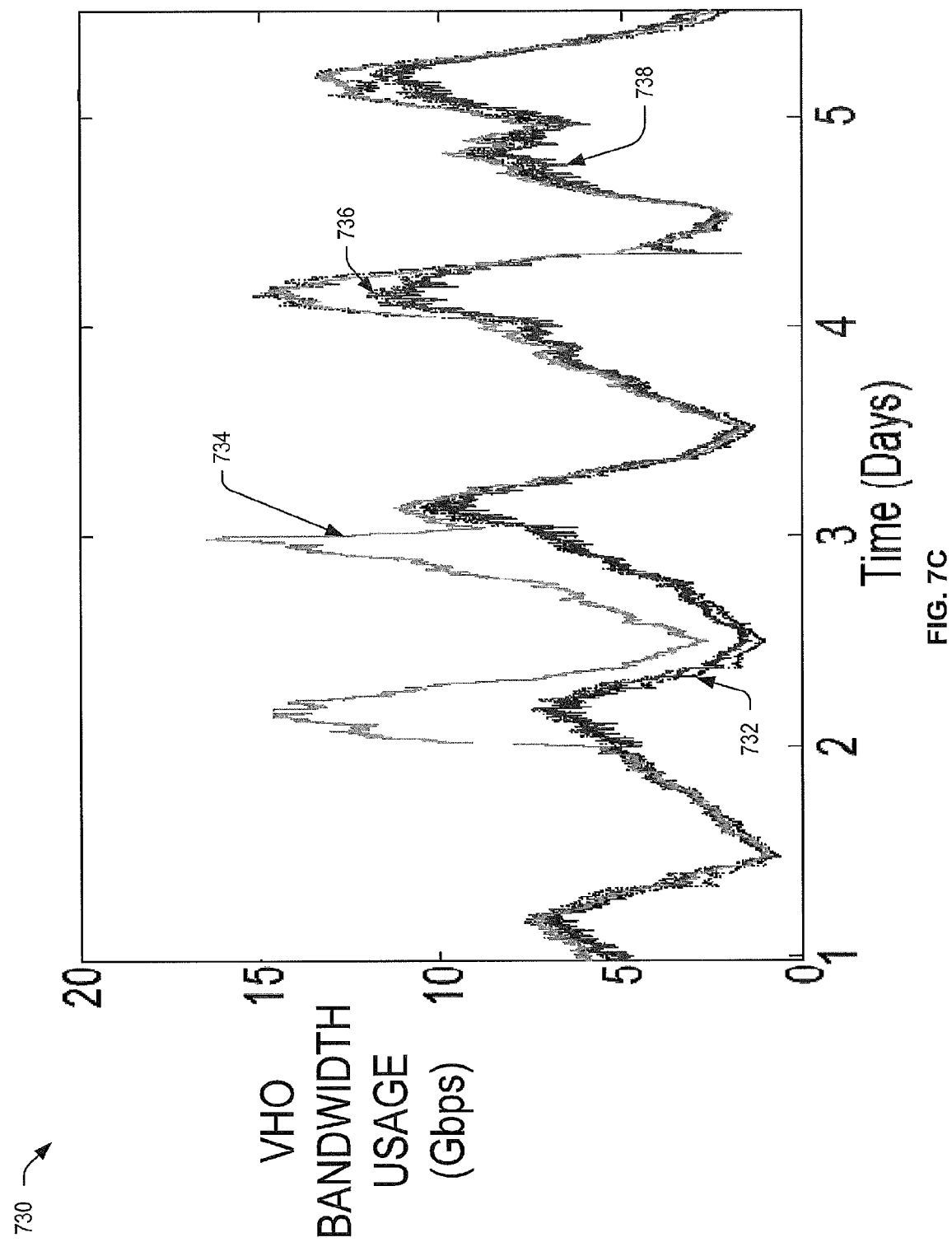

FIGS. 7A-C are graphs illustrating sample data related to total server bandwidth utilization at different levels within a media distribution system, such as a video-on-demand system. In FIG. 7A, a graph 710 illustrates total server bandwidth served out of a second distribution level (L2) of a media distribution system. In FIG. 7B, a graph 720 illustrates total server bandwidth served out of a third distribution level 3 (L3) of the media distribution system. In FIG. 7C, a graph 730 illustrates total server bandwidth usage based on requests served out of a fourth distribution level 4 (L4) (e.g., a video hub office) of the media distribution system. A horizontal axis in each of the graphs 710, 720, 730 is a scale based on days when the sample data was received. A vertical axis in each of the graphs 710, 720, 730 is a scale based on total bandwidth usage measured in Giga-bytes per second (Gbps). The total bandwidth usage is one measure that may provide an indication of load on servers operating in each of the distribution levels L2-L4.

The sample data in each of the graphs 710, 720, 730 correspond to bandwidth usage data that was collected over five days during operation at each of the distribution levels L2-L4 of the media distribution system respectively. This sample data corresponding to the graphs 710, 720, and 730 is based on the assumptions discussed above with respect to the sample data corresponding to FIG. 6. Lines 712, 722, 732 illustrate the bandwidth usage data that is based on content distribution implemented using a caching technique at each of the distribution levels L2-L4 respectively. Lines 714, 724, 734 illustrate the bandwidth usage data that is based on content distribution implemented using a replication technique at each of the distribution levels L2-L4 respectively. Lines 716, 726, 736 illustrate the bandwidth usage data that is based on content distribution implemented using multi-stage at each of the distribution levels L2-L4, respectively, where the distributed content was pre-populated at each of the distribution levels L2-L4 based on the WAFIL algorithm 300 of FIG. 3. Lines 718, 728, 738 illustrate the bandwidth usage data that is based on content distribution implemented using multi-stage batching at each of the distribution levels L2-L4, respectively, where the distributed content was pre-populated at each of the distribution levels L2-L4 based on the DWAFIL algorithm 400 of FIG. 4. The pre-population at each of the distribution levels L2-L4 is based on a complementary cache that uses ten percent of storage capacity available at nodes associated with each of the distribution levels L2-L4.

The graphs 710, 720, 730 illustrate that at each of the distribution levels L2-L4, the total bandwidth usage based on content distribution implemented using multi-stage batching (corresponding to the lines 716, 718, 726, 728, 736, and 738) is less than or similar to the bandwidth usage data that is based on content distribution implemented using a caching technique or replication technique (corresponding to the lines 712, 714, 722, 724, 732, 734). In particular, each of the graphs 710, 720, 730 illustrate that at particular times, such as during day 2 and day 3, the total bandwidth usage based on content distribution implemented using multi-stage batching (corresponding to the lines 716, 718, 726, 728, 736, and 738) may be significantly lower than the bandwidth usage data that is based on content distribution implemented using a caching technique or a replication technique (corresponding to the lines 712, 714, 722, 724, 732, 734).

Observations based on the graphs 710, 720, and 730 suggest content distribution implemented using multi-stage batching based on pre-population of content using the WAFIL algorithm or the DWAFIL algorithm may enable a media distribution system (e.g., a video-on-demand system) to be more scalable than content distribution schemes implemented based on a caching technique or a replication technique. Multi-stage batching enables each level of a distribution system to support higher demands as requests are efficiently aggregated and batched together. Multi-stage batching enables a distribution system to reduce a number of streams allocated at each level in the distribution system. The streaming capacity of servers at various levels (e.g., the distribution levels L2-L4) within a distribution system may be constrained resource. If the remaining streaming capacity is insufficient to serve new requests, the requests may either be blocked or forwarded to another server. Thus, a distribution scheme implemented using multi-stage batching may impose a low load on servers such that distribution may support user requests efficiently as the number of users, library size and streaming data rates increase.

Figure 8:
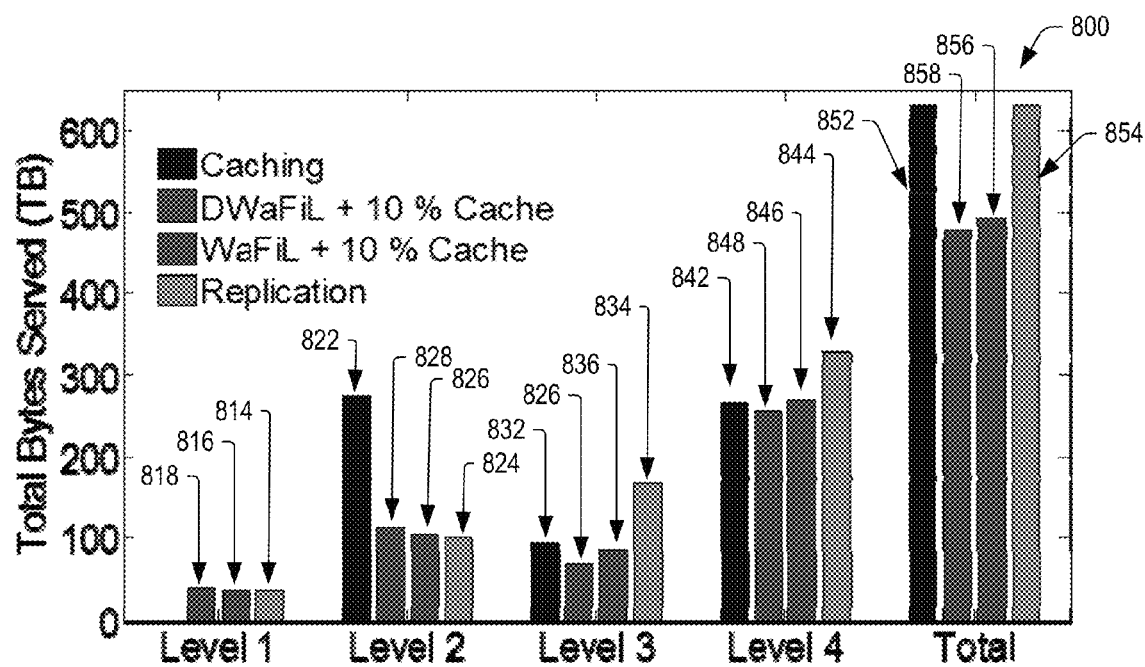
FIG. 8 is a graph illustrating sample data related to total bytes transferred from different levels within a media distribution system.

FIG. 8 is a graph 800 illustrating sample data related to total bytes transferred from different levels within a media distribution system, such as a video-on-demand system. The graph 800 illustrates total bytes transferred from a first distribution level of the media distribution system, a second distribution level (L2) of the media distribution system, a third distribution level (L3) of the media distribution system, a fourth distribution level (L4) of the media distribution system, and a total based on the distribution levels L1-L4. The sample data corresponding to the graph 800 is based on the assumptions discussed above with respect to the sample data corresponding to FIG. 6. The sample data was gathered during a sample time period of operation of the media distribution system. A horizontal axis of the graph 800 is a scale corresponding to a distribution level such as L1, L2, L3, L4, or a Total corresponding to the sample data. A vertical axis of the graph 800 is a scale based on total bytes served measured in terabytes (TB).

The sample data of the graph 800 corresponds to data indicating total bytes served, which were received over five days at each of the distribution levels L1-L4 of the media distribution system respectively. Bars 822, 832, and 842 illustrate the total bytes served based on content distribution implemented using a caching technique at each of the distribution levels L2-L4, respectively. A bar 852 illustrates a sum (Total) of the total bytes served at each of the distribution levels L2-L4 based on content distribution implemented using the caching technique. Bars 814, 824, 834, and 844 illustrate the total bytes served based on content distribution implemented using a replication technique at each of the distribution levels L1-L4, respectively. A bar 854 illustrates a sum (Total) of the total bytes served at each of the distribution levels L1-L4 based on content distribution implemented using the replication technique. Bars 816, 826, 836, and 846 illustrate the total bytes served based on content distribution implemented using the multi-stage batching at each of the distribution levels L1-L4 respectively, where the content that was distributed was pre-populated at each of the distribution levels L1-L4 based on the WAFIL algorithm 300 of FIG. 3. A bar 856 illustrates a sum (Total) of the total bytes served at each of the distribution levels L1-L4 based on content distribution implemented using the WAFIL algorithm. Bars 818, 828, 838, and 848 illustrate the total bytes served based on content distribution implemented using the DWAFIL algorithm 400 of FIG. 4. A bar 858 illustrates a sum (Total) of the total bytes served at each of the distribution levels L1-L4 based on content distribution implemented using the DWAFIL algorithm. The pre-population at each of the distribution levels L1-L4 is based on a complementary cache that uses ten percent of storage capacity available at nodes associated with each of the distribution levels L1-L4.

The graph 800 illustrates that at each of the distribution levels L1, L2, L3, L4, the total bytes served based on content distribution implemented using multi-stage batching (corresponding to the bars 816, 826, 828, 836, 838, 846, 848, 856, and 858) is less than or similar to the total bytes served based on content distribution implemented using the caching technique or the replication technique (corresponding to the bars 812, 814, 822, 824, 832, 834, 842, 844, 852, and 854). The graph 800 illustrates that at the distribution levels L3 and L4, the total bytes served based on content distribution implemented using multi-stage batching (corresponding to the bars 836, 838, 846, 848) may be significantly lower than the bandwidth usage data that is based on content distribution implemented using the replication technique (corresponding to the bars 814, 824, 834, and 844). The graph 800 illustrates that at the distribution level L2, the total bytes served based on content distribution implemented using multi-stage batching (corresponding to the bars 826 and 828) may be significantly lower than the bandwidth usage data that is based on content distribution implemented using the caching technique (corresponding to the bar 822). Based on the sum (Total) of the total bytes served (corresponding to the bars 852-858) from all of the distributions levels L1-L4, each of the distribution levels L1-L4 may serve about twenty-five percent fewer bytes when content distribution is implemented using multi-stage batching (where distributed content is pre-populated in cache at the distribution levels L1-L4) than content distribution implemented using the caching technique or the replication technique. The difference may be attributable to aggregation of user requests (according to multi-stage batching), such that content may be transmitted from a parent node to multiple children nodes in a single stream, thereby reducing duplication of bytes served for a similar content item requested by each of the children nodes.

Figure 9:
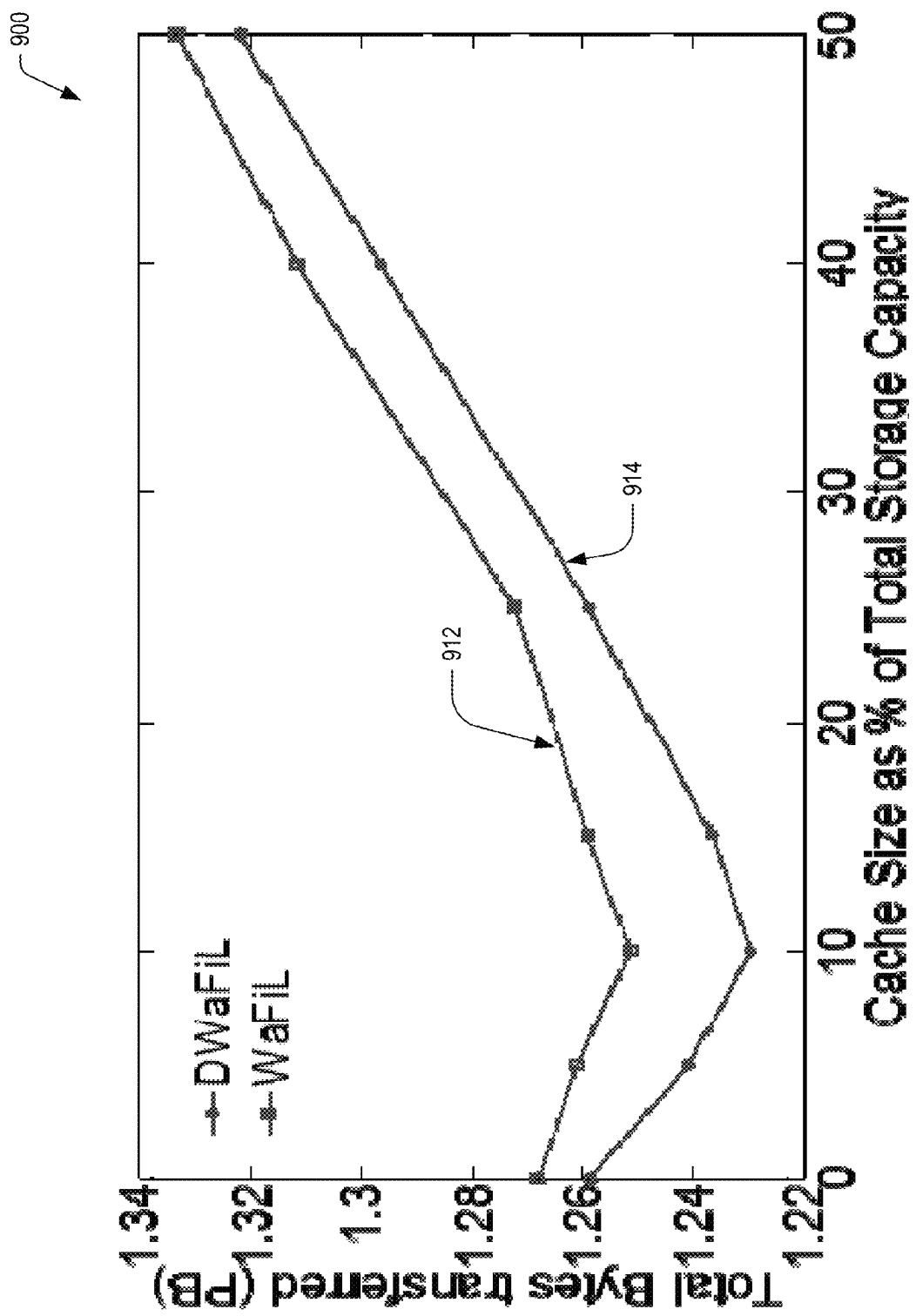
FIG. 9 is a graph illustrating sample data related to aggregated byte transfer across a network (of a media distribution system) as a function of fractional cache size.

Referring to FIG. 9, a graph 900 of sample data related to aggregated byte transfer across a network (of a media distribution system) as a function of fractional cache size is illustrated. The media distribution system may be video-on-demand system. The graph 900 illustrates a measure of an aggregate number of bytes transferred across all network segments as a function of fractional cache size at nodes within the media distribution system. The sample data was gathered during a sample time period of operation of the media distribution system. The sample data corresponding to the graph 900 is based on the assumptions discussed above with respect to the sample data corresponding to FIG. 6. FIG. 9 illustrates a relationship between a measure of an aggregated amount of bytes transferred with the media distribution system and a fractional cache size at nodes within the media distribution system. A horizontal axis in the graph 900 is a scale based on cache size as a percentage of total storage capacity of the network segments within the distribution system. A vertical axis in the graph 900 is a scale based on percent increase in the bytes transferred.

FIG. 9 illustrates a line 912 that corresponds to a measure of an aggregated number of bytes transferred within the media distribution system that implements content distribution using multi-stage batching, where the content that is distributed is pre-populated at distribution levels based on the WAFIL algorithm 300 of FIG. 3. The line 912 illustrates that the percentage of bytes transferred within the media distribution system (implementing the multi-stage batching based on the WAFIL algorithm 300 of FIG. 3) may decrease as the fractional cache size is adjusted from zero percent of total storage capacity to ten percent of total storage capacity. The line 912 illustrates that the percentage bytes transferred within the media distribution system may increase as a function of an increase in the fractional cache size above ten percent of total storage capacity. A lowest percentage of bytes transferred may be achieved when the fractional cache size is approximately ten percent of the total storage capacity.

A line 914 illustrates a measure of an aggregated amount of bytes transferred within the distribution system that implements content distribution using multi-stage batching, where the content that is distributed is pre-populated at distribution levels based on the DWAFIL algorithm 400 of FIG. 4. The line 914 exhibits a similar behavior as the line 912. That is, a lowest percentage of bytes transferred within the media distribution system (implementing multi-stage batching based on the DWAFIL algorithm 400 of FIG. 4) may be achieved when the fractional cache size is approximately ten percent of the total storage capacity.

Figure 10A:
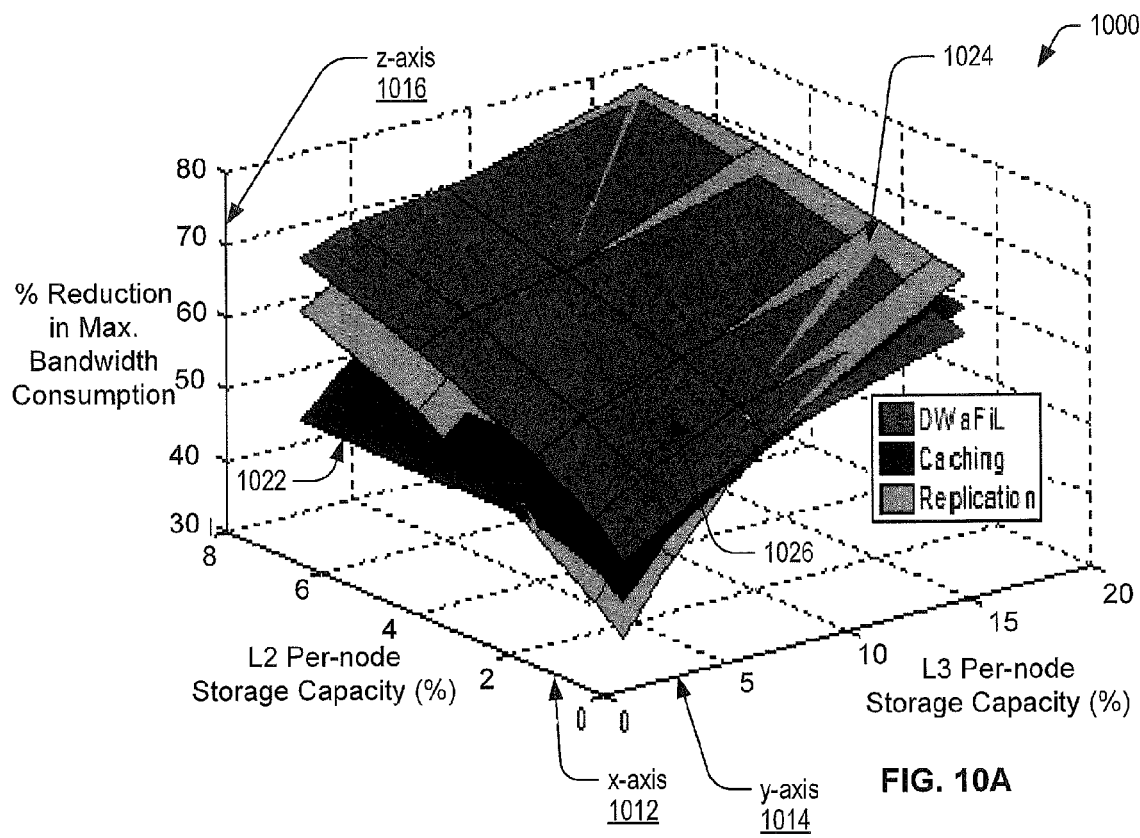
FIGS. 10A and 10B are graphs illustrating sample data related to a calculation based on video hub office bandwidth consumption within a media distribution system.
Figure 10B:
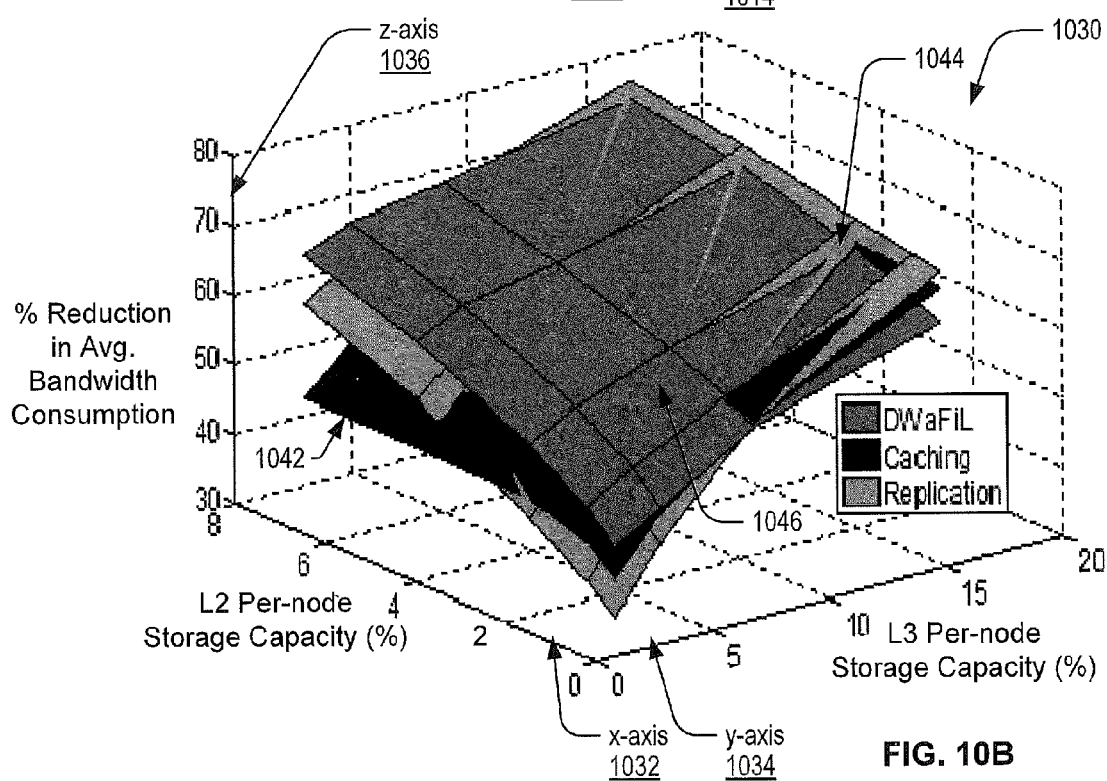

Referring to FIGS. 10A and 10B, graphs of sample data related to a calculation based on video hub office bandwidth consumption within a media distribution system are illustrated. The media distribution system may be a video-on-demand system. The sample data corresponding to FIGS. 10 and 10B is based on the assumptions discussed above with respect to the sample data corresponding to FIG. 6.

In FIG. 10A, a graph 1000 illustrates a percentage reduction in maximum video hub office bandwidth consumption within a media distribution system. In FIG. 10B, a graph 1030 illustrates a percentage reduction in average video hub office bandwidth consumption within a media distribution system. An x-axis 1012 in FIG. 10A and an x-axis 1032 in FIG. 10B each correspond to a scale based on percentage of storage capacity per-node at a second distribution level (L2) in the media distribution system. A y-axis 1014 in FIG. 10A and a y-axis 1034 in FIG. 10B each correspond to a scale based on percentage of storage capacity per-node at a third distribution level (L3) in the media distribution system. A z-axis 1016 in FIG. 10A corresponds to a scale based on percentage of reduction in maximum bandwidth consumption at a video hub office within the media distribution system. A z-axis 1036 in FIG. 10B corresponds to a scale based on percentage of reduction in average bandwidth consumption at a video hub office within the media distribution system.

An area 1022 illustrates a percentage reduction in maximum bandwidth consumption at the video hub office, where content distribution is implemented using a caching technique. The percentage reduction in maximum bandwidth consumption corresponding to the area 1022 is a function based on percentage of storage capacity per-node in L2 (corresponding to the x-axis 1012) and based on percentage of storage capacity per-node in L3 (corresponding to the y-axis 1014). An area 1024 illustrates a percentage reduction in maximum bandwidth consumption at the video hub office, where content distribution is implemented using a replication technique at the distribution levels (e.g., L2 and L3). The percentage reduction in maximum bandwidth consumption corresponding to the area 1024 is a function based on percentage of storage capacity per-node in L2 (corresponding to the x-axis 1012) and based on percentage of storage capacity per-node in L3 (corresponding to the y-axis 1014). An area 1026 illustrates a percentage reduction in maximum bandwidth consumption at the video hub office, where content distribution is implemented using the multi-stage batching based on the DWAFIL algorithm 400 of FIG. 4. The resulting percentage reduction in maximum bandwidth consumption corresponding to the area 1026 is a function based on percentage of storage capacity per-node in L2 (corresponding to the x-axis 1012) and based on percentage of storage capacity per-node in L3 (corresponding to the y-axis 1014).

An area 1042 illustrates a percentage reduction in average bandwidth consumption at the video hub office, where content distribution is implemented using the caching technique. The percentage reduction in average bandwidth consumption corresponding to the area 1042 is a function based on percentage of storage capacity per-node in L2 (corresponding to the x-axis 1032) and based on percentage of storage capacity per-node in L3 (corresponding to the y-axis 1034). An area 1024 illustrates a percentage reduction in average bandwidth consumption at the video hub office, where content distribution implemented using the replication technique at the distribution levels (e.g., L2 and L3). The percentage reduction in average bandwidth consumption corresponding to the area 1044 is a function based on percentage of storage capacity per-node in L2 (corresponding to the x-axis 1032) and based on percentage of storage capacity per-node in L3 (corresponding to the y-axis 1034). An area 1046 illustrates a percentage reduction in average bandwidth consumption at the video hub office, where content distribution implemented using the multi-stage batching described based on the DWAFIL algorithm 400 of FIG. 4. The percentage reduction in average bandwidth consumption corresponding to the area 1046 is a function based on percentage of storage capacity per-node in L2 (corresponding to the x-axis 1032) and based on percentage of storage capacity per-node in L3 (corresponding to the y-axis 1034).

The sample data corresponding to the graphs 1000, 1030 represent performance of content distribution across all distribution levels within the distribution system, as the load handled by all the distribution levels is accumulated and mitigated at the video hub office of the media distribution system. As illustrated by FIGS. 10A and 10B, a reduction in maximum bandwidth consumption and a reduction in average bandwidth consumption is higher for many combinations of L2 and L3 per-node storage capacities when the video hub office distributes content implemented using the multi-stage batching (supported by pre-populated content based on the DWAFIL algorithm) as opposed to distribution of content implemented using the caching or the replication techniques. In some cases, a reduction in maximum bandwidth consumption and a reduction in average bandwidth consumption may be higher for content distribution implemented using the replication techniques as compared to content distribution implemented using multi-stage batching; however, this result may occur when the L3 per-node storage capacity is very high (e.g., approximately twenty percent). Because L3 may situated at several locations, deploying large amounts of storage to meet such a storage capacity, such as at least twenty percent, at each location may not be cost efficient. Moreover, a cost associated with updating content at each location may also increase due to the increase in storage capacity. For content distribution implemented using multi-stage batching, a resulting load on the video hub office may be low, thereby allowing increased number of users, data rates, and library sizes. FIGS. 10A and 10B show that bandwidth consumption at the video hub office may be reduced by serving initial segments of some videos from lower levels (e.g., a first distribution level and a second distribution level) and by taking advantage of multicasting through multi-stage batching of requests. Therefore, the sample data illustrated in FIGS. 10A and 10B may suggests that content distribution, at the video hub office, implemented using multi-stage batching (supported by pre-populated content based on the DWAFIL algorithm) may provide significantly more scalability than content distribution implemented using the caching techniques or the replication techniques for all storage sizes.

Figure 11:
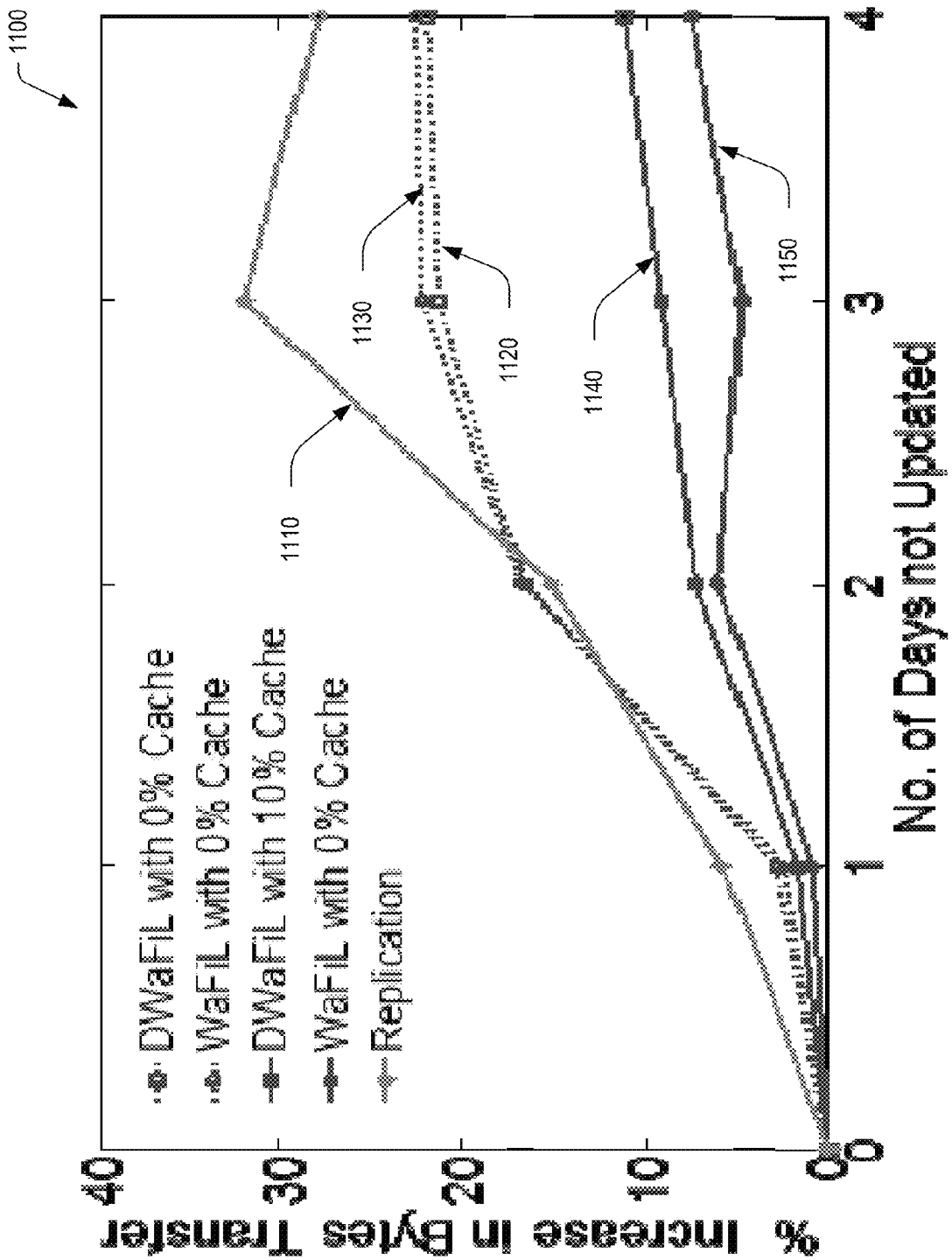
FIG. 11 is a graph illustrating percentage increase of byte transfer at a video hub office (of a media distribution system) when pre-populated content is not updated.

FIG. 11 is a graph 1100 illustrating percentage increase in byte transfer at a video hub office (of a media distribution system) when pre-populated content is not updated. The media distribution system may be a video-on-demand system. The graph 1100 is based on sample data collected during operation of a video-on-demand system over a sample four day period. The graph 1100 illustrates a measure of percentage increase in number of bytes transfer at a video hub office of a video-on-demand system over a four day period during which pre-populated content was not updated at the distribution levels within the video-on-demand system. A horizontal axis in the graph 1100 is a scale based on number of days pre-populated content was not updated within the distribution levels of the video-on-demand system. A vertical axis in the graph 1100 is a scale based on percentage increase in bytes transferred at the video hub office of the video-on-demand system.

A line 1110 illustrates a percentage increase in bytes transferred (over a four day period when pre-populated content is not updated) at the video hub office that implements content distribution using a replication technique. In FIG. 11, a line 1120 is illustrated that reflects a percentage increase in bytes transferred (over a four day period when pre-populated content is not updated) at a video hub office within a video-on-demand system that implements content distribution using the multi-stage batching, where the content that is distributed is pre-populated at distribution levels based on the DWAFIL algorithm 400 of FIG. 4. A line 1130 illustrates a percentage increase in bytes transferred (over a four day period when pre-populated content is not updated) at the video hub office that implements content distribution using the multi-stage batching, where the content that is distributed is pre-populated at distribution levels based on the WAFIL algorithm 300 of FIG. 3. With respect to the sample data corresponding to the lines 1120 and 1130, the pre-population at the distribution levels were based on a complementary cache that uses zero percent of storage capacity available at nodes associated with each of the distribution levels.

A line 1140 illustrates a percentage increase in bytes transferred (over a four day period when pre-populated content is not updated) at the video hub office that implements content distribution using multi-stage batching, where the content that is distributed is pre-populated at distribution levels based on the DWAFIL algorithm 400 of FIG. 4. A line 1150 illustrates a percentage increase in bytes transferred (over a four day period when pre-populated content is not updated) at the video hub office that implements content distribution using multi-stage batching, where the content that is distributed is pre-populated at distribution levels based on the WAFIL algorithm 300 of FIG. 3. In each of the video-on-demand systems from which the sample data was gathered that corresponds to the lines 1140 and 1150, the pre-population at the distribution levels is based on a complementary cache that uses ten percent of storage capacity available at nodes associated with each of the distribution levels.

The sample data in the graph 1100 shows that, in video-on-demand systems implemented using one of the techniques (replication or multi-stage batching), the percentage increase in bytes transferred from a video hub office increases over number of days that pre-populated content is not updated at the distribution levels within the video-on-demand system. The graph 1110 also indicates that the percentage increase in bytes transferred from the video hub office increases by a lesser percentage (e.g., approximately ten percent) when the video-on-demand system implemented using multi-stage batching (where content is pre-populated based on the WAFIL or DWAFIL algorithm and the complementary cache size uses ten percent of storage capacity) as compared to the percentage increase in bytes transferred (e.g., approximately thirty percent) for the video-on-demand system implemented using the replication technique. This result may be explained by pre-population of content at a complementary cache that has a size of ten percent of storage capacity of a node. However, the graph 1110 also indicates that the percentage increase in bytes transferred from the video hub office increases by a lesser percentage for the video-on-demand system implemented using multi-stage batching as compared to the percentage increase in bytes transferred (e.g., approximately thirty percent) for the video-on-demand system implemented using a replication technique even when the complementary cache size uses zero percent of storage capacity.

Thus, even when the complementary cache size is eliminated by adjusting complementary cache size to zero percent, the percentage increase in bytes transferred from a video hub office may be less for content distribution implemented using the multi-stage batching than for content distribution implemented using the replication technique. While the percentage in bytes transferred may increase, content distribution implemented using multi-stage batching may result in a lesser increase in bytes transferred from a video hub office.

Figure 12:
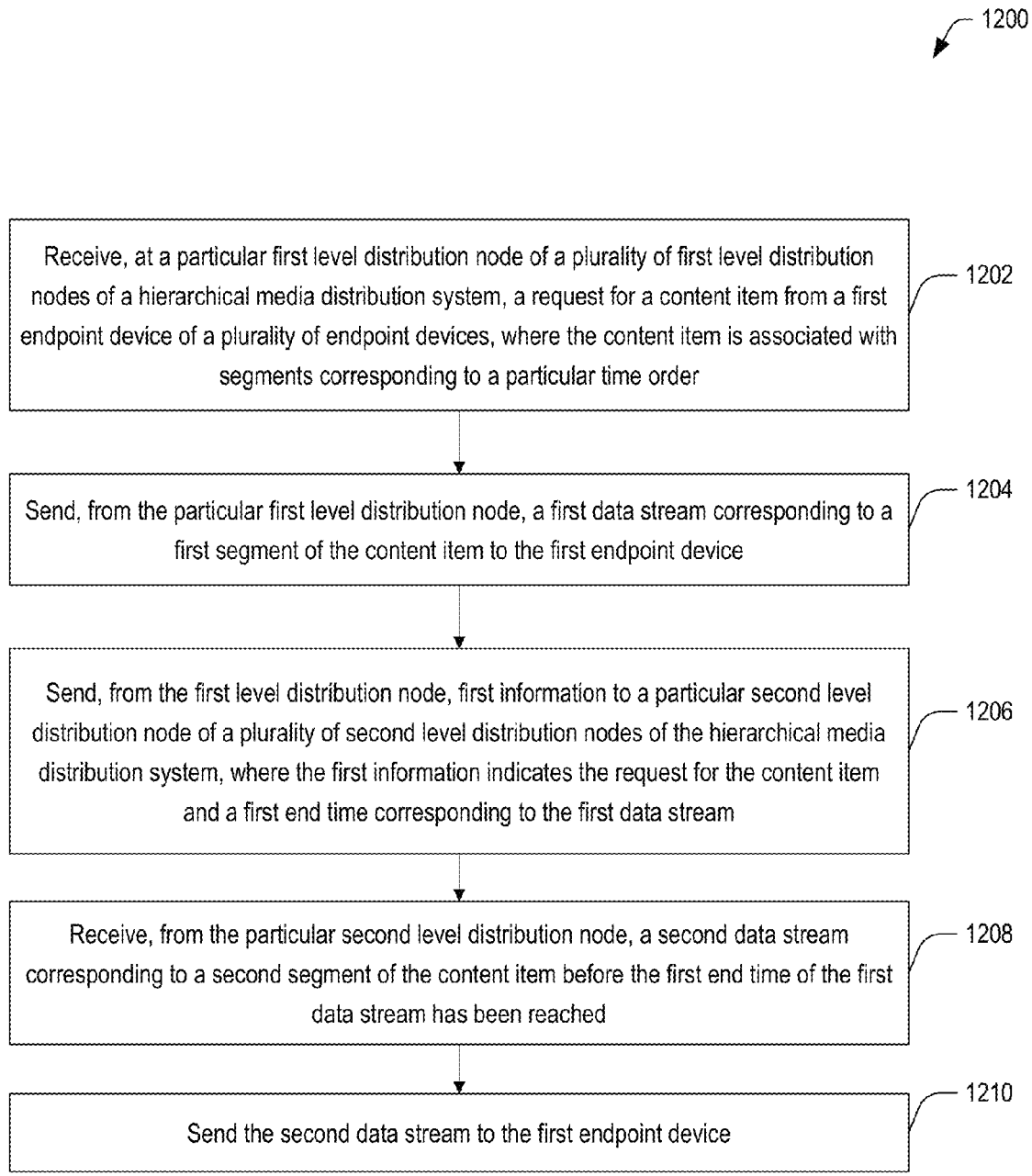
FIG. 12 is a flow chart illustrating a first embodiment of a method of sending a content item from a media distribution system.

Referring to FIG. 12, a flow chart illustrating a first embodiment of a method 1200 of sending a content item from a media distribution system is shown. The method 1200 may be performed by a computing device acting as a distributing node of a HMDS, such as the first level distribution node 122 of FIG. 1.

At 1202, the method 1200 includes receiving, at a particular first level distribution node of a plurality of first level distribution nodes of a hierarchical media distribution system, a request for a content item from a first endpoint device of a plurality of endpoint devices. For example, the first level distribution node 122 of FIG. 1 of the media distribution system 110 may receive the request 166 for a content item from the first endpoint device 160 of a plurality of endpoint devices 160, 170, 180, 190. The content item may be associated with segments corresponding to a particular time order.

At 1204, the method 1200 includes sending, from the particular first level distribution node, a first data stream corresponding to a first segment of the content item to the first endpoint device. For example the first level distributions node 122 of FIG. 1 may send a first data stream corresponding to the first segment 168 of the content item to the first endpoint device 160.

At 1206, the method 1200 includes sending, from the first level distribution node, first information to a particular second level distribution node of a plurality of second level distribution nodes of the hierarchical media distribution system. For example, the first level distribution node 122 of FIG. 1 may send the first information 102 to the second level distribution node 132 of a plurality of second level distributions nodes 132, 194 of the media distribution system 110. The first information 102 may indicate the request 166 for a content item and a first end time corresponding to a first data stream.

At 1208, the method 1200 includes receiving, from the particular second level distribution node, a second data stream corresponding to a second segment of the content item before the first end time of the first data stream has been reached. For example, the first level distribution node 122 of FIG. 1 may receive from the second level distribution node 132 a second data stream corresponding to the second segment 104 of the content item before the first end time of the first data stream has been reached.

At 1210, the method 1200 includes sending the second data stream to the first endpoint device. For example, the first level distribution node 122 of FIG. 1 may send a second data stream (corresponding to the second segment 104) to the first endpoint device 160.

Figure 13:
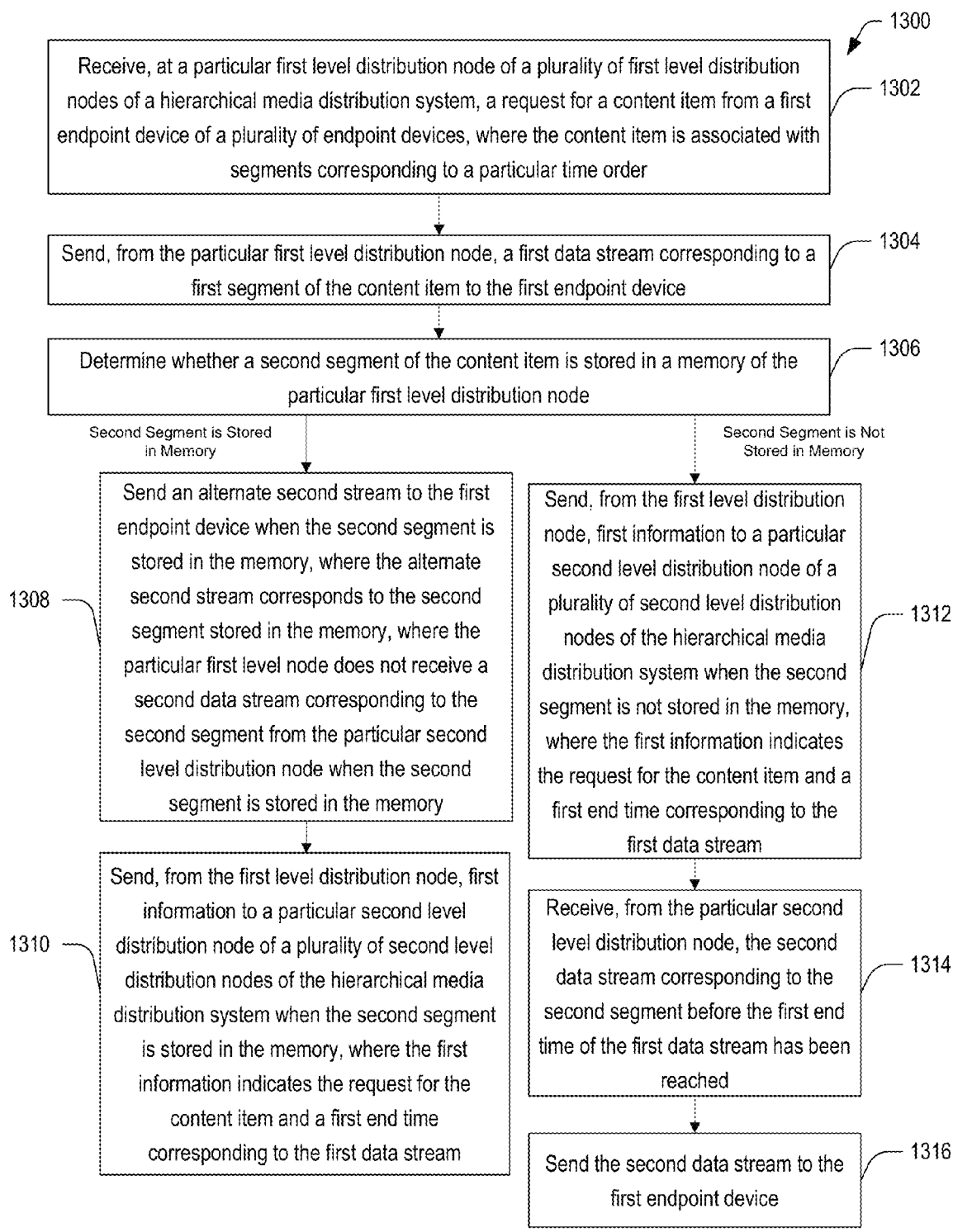
FIG. 13 is a flow chart illustrating a second embodiment of a method of sending a content item from a media distribution system.

Referring to FIG. 13, a flow chart illustrating a second embodiment of a method 1300 of sending a content item from a media distribution system is shown. The method 1300 may be performed by a computing device acting as a distributing node of a HMDS, such as the first level distribution node 122 of FIG. 1.

At 1302, the method 1300 includes receiving, at a particular first level distribution node of a plurality of first level distribution nodes of a hierarchical media distribution system, a request for a content item from a first endpoint device of a plurality of endpoint devices. For example, the first level distribution node 122 of FIG. 1 of the media distribution system 110 may receive the request 166 for a content item from the first endpoint device 160 of a plurality of endpoint devices 160, 170, 180, 190. The content item may be associated with segments corresponding to a particular time order.

At 1304, the method 1300 includes sending, from the particular first level distribution node, a first data stream corresponding to a first segment of the content item to the first endpoint device. For example the first level distributions node 122 of FIG. 1 may send a first data stream corresponding to the first segment 168 of the content item to the first endpoint device 160.

At 1306, the method 1300 includes determining whether a second segment of the content item is stored in a memory of the particular first level distribution node. For example, the first level distribution node 122 of FIG. 1 may determine whether the second segment 104 of the content item is stored in the memory 126 of the particular first level distribution node 122.

At 1308, the method 1300 includes sending an alternate second stream to the first endpoint device when the second segment is stored in the memory. The alternate second stream may correspond to the second segment stored in the memory. The particular first level node may not receive the second data stream from the particular second level distribution node when the second segment is stored in the memory.

For example, the first level distribution node 122 may send an alternate second stream to the first endpoint device 160 of FIG. 1 when the second segment 104 is stored in the memory 126. The alternate second stream may correspond to the second segment 104 stored in the memory 126. The particular first level node 122 may not receive a second data stream corresponding to the second segment 104 from the particular second level distribution node 132 when the second segment 104 is stored in the memory 126.

At 1310, the method 1300 includes sending, from the first level distribution node, first information to a particular second level distribution node of a plurality of second level distribution nodes of the hierarchical media distribution system when the second segment is stored in the memory. For example, the first level distribution node 122 of FIG. 1 may send first information 102 to the second level distribution node 132 of a plurality of second level distributions nodes 132, 194 of the media distribution system 110 when the second segment 104 is stored in the memory 126. The first information 102 may indicate the request 166 for a content item and a first end time corresponding to a first data stream.

At 1312, the method 1300 includes sending, from the first level distribution node, first information to a particular second level distribution node of a plurality of second level distribution nodes of the hierarchical media distribution system when the second segment is not stored in the memory. For example, the first level distribution node 122 of FIG. 1 may send first information 102 to the second level distribution node 132 of a plurality of second level distributions nodes 132, 194 of the media distribution system 110 when the second segment 104 is not stored in the memory 126. The first information 102 may indicate the request 166 for a content item and a first end time corresponding to a first data stream.

At 1314, the method 1300 includes receiving, from the particular second level distribution node, the second data stream corresponding to the second segment before the first end time of the first data stream has been reached. For example, the first level distribution node 122 of FIG. 1 may receive, from the second level distribution node 132, the second data stream corresponding to the second segment 104 before the first end time of the first data stream has been reached.

At 1316, the method 1300 includes sending the second data stream to the first endpoint device. For example, the first level distribution node 122 of FIG. 1 may send a second data stream (corresponding to the second segment 104) to the first endpoint device 160.

Figure 14:
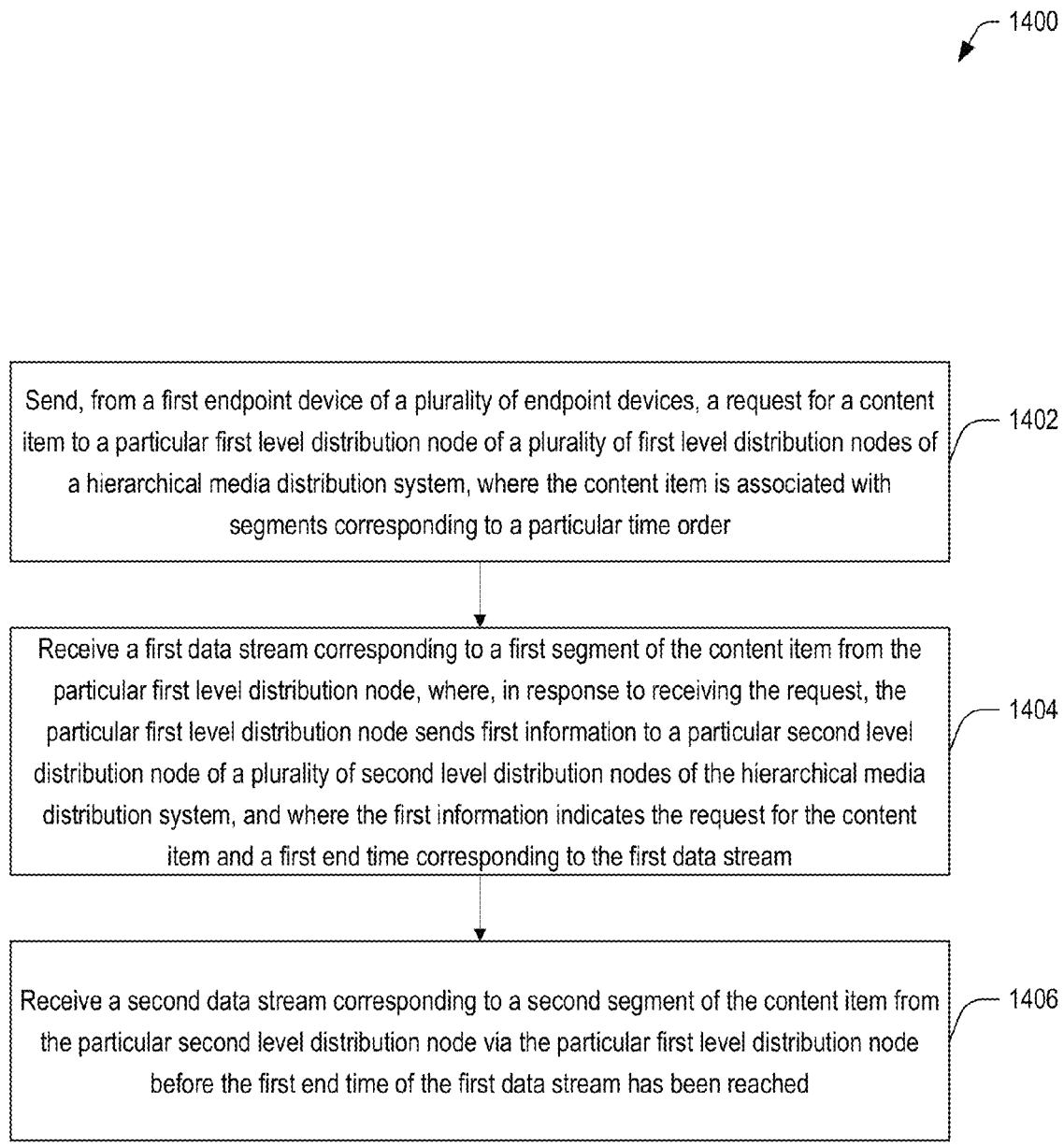
FIG. 14 is a flow chart illustrating an embodiment of a method to receive a content item from a media distribution system.

Referring to FIG. 14, a flow chart illustrating an embodiment of a method 1400 to receive a content item from a media distribution system is illustrated. The method 1400 may be performed by a computing device acting as an endpoint device of a HMDS, such as the first endpoint device 160 of FIG. 1.

At 1402, the method 1400 includes sending, from a first endpoint device of a plurality of endpoint devices, a request for a content item to a particular first level distribution node of a plurality of first level distribution nodes of a hierarchical media distribution system. For example, the first endpoint device 160 of FIG. 1 of the plurality of endpoint devices 160, 170, 180, 190 may send the request 166 for a content item to the first level distribution node 122 of the plurality of first level distribution nodes 122, 192 of the media distribution system 110. The content item may be associated with segments corresponding to a particular time order.

At 1404, the method 1400 includes receiving a first data stream corresponding to a first segment of the content item from the particular first level distribution node. For example, the first endpoint device 160 of FIG. 1 may receive a first data stream corresponding to the first segment 168 of the content item from the first level distribution node 122. The particular first level distribution node, in response to receiving the request, may send first information to a particular second level distribution node of a plurality of second level distribution nodes of the hierarchical media distribution system. The first information may indicate the request for the content item and a first end time corresponding to the first data stream. For example, the first level distribution node 122, in response to receiving the request 166, may send the first information 102 to the second level distribution node 132 of the plurality of second level distribution nodes 132, 194 of the media distribution system. The first information 102 may indicate the request 166 for the content item and the first end time corresponding to the first data stream.

At 1406, the method 1400 includes receiving a second data stream corresponding to a second segment of the content item from the particular second level distribution node via the particular first level distribution node before the first end time of the first data stream has been reached. For example, the first endpoint device 160 of FIG. 1 may receive a second data stream corresponding to the second segment 104 of the content item from the second level distribution node 132 via the first level distribution node 122 before the first end time of the first data stream has been reached.

Figure 15:
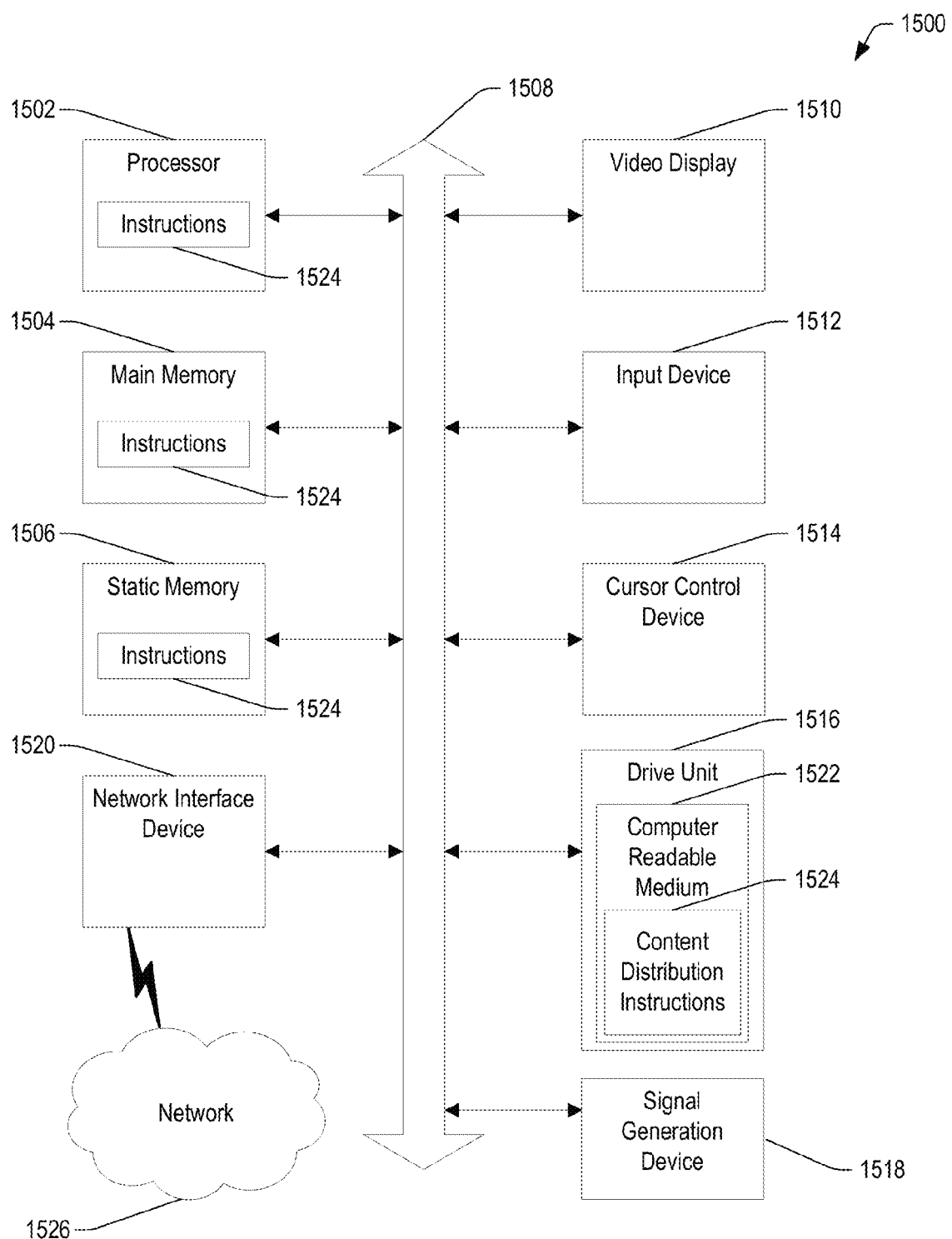
FIG. 15 is an illustration of an illustrative embodiment of a general computer system.

Referring to FIG. 15, an illustrative embodiment of a general computer system is shown and is designated 1500. The computer system 1500 may include a set of instructions that can be executed to cause the computer system 1500 to perform any one or more of the methods or computer based functions disclosed herein. The computer system 1500 may operate as a standalone device or may be connected, e.g., using a network, to other computer systems or peripheral devices. For example, the computer system 1500 may include, be included within, or correspond to one or more of the components of the media distribution system 110, the first distribution node level 120, the second distribution node level 130, the third distribution node level 140, the fourth distribution node level 150, one or more of the plurality of endpoint devices 160, 170, 180, 190, one or more of the first level distribution nodes 122, 192, one or more of the second level distribution nodes 132, 194, one or more of the third level distribution nodes 142, 196, one or more of the fourth level distribution nodes 152, 198, or a combination thereof described with reference to FIG. 1.

In a networked deployment, the computer system 1500 may operate in the capacity of a server or as a client user computer in a server-client user network environment, or as a peer computer system in a peer-to-peer (or distributed) network environment. The computer system 1500 may also be implemented as or incorporated into various devices, such as a personal computer (PC), a tablet PC, a STB, a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 1500 may be implemented using electronic devices that provide video, audio, or data communication. Further, while a single computer system 1500 is illustrated, the term "system" shall also be taken to include any collection of systems or sub-systems that individually or jointly execute a set, or multiple sets, of instructions to perform one or more computer functions.

As illustrated in FIG. 15, the computer system 1500 may include a processor 1502, e.g., a central processing unit (CPU), a graphics processing unit (GPU), or both. The processor 1502 may be the processor 162 of FIG. 1, the processor 172 of FIG. 1, the processor 124 of FIG. 1, the processor 134 of FIG. 1, the processor 144 of FIG. 1, the processor 154 of FIG. 1, or a combination thereof. Moreover, the computer system 1500 may include a main memory 1504 and a static memory 1506, which can communicate with each other via a bus 1508. For example, the main memory 1504 may be the memory 164 of FIG. 1, the memory 174 of FIG. 1, the memory 126 of FIG. 1, the memory 136 of FIG. 1, the memory 146 of FIG. 1, the memory 156 of FIG. 1, or a combination thereof. As shown, the computer system 1500 may further include a video display unit 1510, such as a liquid crystal display (LCD), a flat panel display, a solid state display, or a lamp assembly of a projection system. Additionally, the computer system 1500 may include an input device 1512, such as a keyboard, and a cursor control device 1514, such as a mouse. The computer system 1500 may also include a drive unit 1516, a signal generation device 1518, such as a speaker or remote control, and a network interface device 1520. Some computer systems 1500 may not include an input device (e.g., a server may not include an input device).

In a particular embodiment, as depicted in FIG. 15, the drive unit 1516 may include a computer-readable non-transitory storage medium 1522 in which one or more sets of instructions 1524, e.g. software, can be embedded. Further, the instructions 1524 (e.g., content distribution instructions) may embody one or more of the methods or logic as described herein. In a particular embodiment, the content distribution instructions 1524 may reside completely, or at least partially, within the main memory 1504, the static memory 1506, and/or within the processor 1502 during execution by the computer system 1500. The main memory 1504 and the processor 1502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable device (e.g., computer-readable non-transitory storage medium 1522) that stores the instructions 1524 or receives, stores, and executes the instructions 1524, so that a device connected to a network 1526 may communicate voice, video or data over the network 1526. For example, the device may include or be included within one or more of the components of the media distribution system 110, the first distribution node level 120, the second distribution node level 130, the third distribution node level 140, the fourth distribution node level 150, one or more of the plurality of endpoint devices 160, 170, 180, 190, one or more of the first level distribution nodes 122, 192, one or more of the second level distribution nodes 132, 194, one or more of the third level distribution nodes 142, 196, one or more of the fourth level distribution nodes 152, 198, or a combination thereof described with reference to FIG. 1. While the tangible computer-readable storage medium is shown to be a single medium, the term "tangible computer-readable medium" includes a single medium or multiple media, such as a centralized or distributed database, and/or associated caches and servers that store one or more sets of instructions. The term "tangible computer-readable medium" shall also include any non-transitory medium that is capable of storing a set of instructions for execution by a processor or that cause a computer system to perform any one or more of the methods or operations disclosed herein.

In a particular non-limiting, exemplary embodiment, the tangible computer-readable storage medium may include a solid-state memory such as a memory card or other package that houses one or more non-volatile read-only memories. Further, the tangible computer-readable storage medium may be a random access memory or other volatile re-writable memory. Additionally, the tangible computer-readable storage medium may include a magneto-optical or optical medium, such as a disk or tapes or other storage device. Accordingly, the disclosure is considered to include any one or more of a tangible computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards and protocols for communication include real-time transport protocol (RTP), transmission control protocol (TCP)/internet protocol (IP), user datagram protocol (UDP)/internet protocol (IP), code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, or a combination thereof. Such standards and protocols are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a first level distribution node of a plurality of first level distribution nodes of a hierarchical media distribution system, a request for a content item from a first endpoint device of a plurality of endpoint devices, wherein the content item is associated with segments corresponding to a particular time order;
   in response to receiving the request:
      sending, from the first level distribution node, a first data stream corresponding to a first segment of the content item to the first endpoint device;
      sending, from the first level distribution node, first information to a second level distribution node of a plurality of second level distribution nodes of the hierarchical media distribution system, wherein the first information indicates a first end time corresponding to the first data stream;
   receiving, from the second level distribution node at the first level distribution node responsive to the first information, a second data stream corresponding to a second segment of the content item before the first end time of the first data stream has been reached; and
   sending the second data stream to the first endpoint device from the first level distribution node.

2. The method of claim 1, wherein the first segment is stored at the first level distribution node before the request is received, wherein the second data stream is received at the first level distribution node prior to a second end time indicated by second information received at the second level distribution node, the second information sent from another first level distribution node of the plurality of first level distribution nodes, and the second information corresponds to a second request, received at the other first level distribution node from a second endpoint device, for the content item.

3. The method of claim 2, wherein, before the request is received, the first segment is received at the first level distribution node from the second level distribution node via a multicast transmission.

4. The method of claim 1, wherein the first segment of the content item is presented at the first endpoint device after receipt of at least a portion of the first segment from the first level distribution node.

5. The method of claim 1, wherein the first segment corresponds to a first time period according to the particular time order and the second segment corresponds to a second time period in the particular time order, the second time period beginning immediately after the first time period ends, and wherein the second data stream corresponding to the second segment is received at the first distribution level node from the second level distribution node responsive to the first information.

6. The method of claim 1, wherein, in response to the first information, the second level distribution node sends second information to a third level distribution node of the hierarchical media distribution system, wherein the third level distribution node is a parent node of the second level distribution node, wherein the first level distribution node is a child node of the second level distribution node, wherein the second information indicates the request for the content item and a second end time of the second data stream, and wherein the method further comprises:
   receiving, at the first level distribution node, a third data stream corresponding to a third segment of the content item before the second end time of the second data stream has been reached; and
   sending the third data stream to the first endpoint device.

7. The method of claim 6, wherein, before the second level distribution node sends the second information, the second level distribution node determines whether the third segment is stored in a memory of the second level distribution node, and wherein the second level distribution node does not receive the third data stream from the third level distribution node when the third segment is stored in the memory of the second level distribution node.

8. The method of claim 6, wherein the third data stream is received via a multicast transmission, wherein the multicast transmission is also received by a second first level distribution node that is served by the plurality of second level distribution nodes, the plurality of second level distribution nodes served by the third level distribution node, and wherein the third level distribution node received information indicating a particular request for the content item within a particular timeframe.

9. The method of claim 1, wherein the second data stream is received via a multicast transmission, wherein the multicast transmission is also received by a second first level distribution node that is served by the second level distribution node and that received a particular request for the content item within a particular timeframe.

10. The method of claim 1, wherein the second data stream is received via a unicast transmission when no other first level distribution node served by the second level distribution node receives another request for the content item within a particular timeframe.

11. The method of claim 1, wherein a size of each of the segments corresponding to the particular time order for the content item is determined based on a water-filling algorithm, wherein the water-filling algorithm is performed based on adjusting a maximum size of one of the segments, where each of the segments are equal in size.

12. The method of claim 1, wherein a size of each of the segments corresponding to the particular time order for the content item is determined based on a water-filling algorithm, wherein the water-filling algorithm accounts for expected viewer session length for the content item.

13. The method of claim 1, further comprising determining whether the second segment is stored in a memory of the first level distribution node before sending the first information, wherein the first level distribution node does not receive the second data stream from the second level distribution node when the second segment is stored in the memory.

14. The method of claim 13, further comprising sending an alternate second stream to the first endpoint device when the second segment is stored in the memory, wherein the alternate second stream corresponds to the second segment stored in the memory.

15. The method of claim 1, wherein the second segment is stored at a cache of the first level distribution node after receipt from the second level distribution node and before the second data stream is sent to the first endpoint device.

16. A system comprising:
a processor of a first level distribution node of a plurality of first level distribution nodes of a hierarchical media distribution system; and
a memory accessible to the processor, the memory including instructions that, when executed by the processor, cause the processor to perform operations comprising:
receiving a request for a content item from a first endpoint device of a plurality of endpoint devices, wherein the content item is associated with segments corresponding to a particular time order;
in response to receiving the request:
sending a first data stream corresponding to a first segment of the content item to the first endpoint device;
sending first information to a second level distribution node of a plurality of second level distribution nodes of the hierarchical media distribution system, wherein the first information indicates a first end time corresponding to the first data stream;
receiving, from the second level distribution node responsive to the first information, a second data stream corresponding to a second segment of the content item before the first end time of the first data stream has been reached; and
sending the second data stream to the first endpoint device.

17. The system of claim 16, wherein the first endpoint device is a first customer premises equipment device, the customer premises equipment including a residential gateway device or a media device.

18. The system of claim 16, wherein the first level distribution node includes a digital subscriber line access multiplexer and wherein the second level distribution node includes a server of a central office, a server of a video hub office, or a combination thereof.

19. The system of claim 16, wherein the hierarchical media distribution system includes an internet protocol television network.

20. A computer-readable storage device including instructions that, when executed by a processor of a first level distribution node of a hierarchical media distribution system, cause the processor to perform a method comprising:
receiving a request for a content item from a first endpoint device of a plurality of endpoint devices, wherein the content item is associated with segments corresponding to a particular time order;
in response to receiving the request:
sending a first data stream corresponding to a first segment of the content item to the first endpoint device;
sending first information to a second level distribution node of a plurality of second level distribution nodes of the hierarchical media distribution system, wherein the first information indicates a first end time corresponding to the first data stream;
receiving, from the second level distribution node responsive to the first information, a second data stream corresponding to a second segment of the content item before the first end time of the first data stream has been reached; and
sending the second data stream to the first endpoint device.

* * * * *